US007991817B2

(12) United States Patent
DeHon et al.

(10) Patent No.: US 7,991,817 B2
(45) Date of Patent: Aug. 2, 2011

(54) METHOD AND A CIRCUIT USING AN ASSOCIATIVE CALCULATOR FOR CALCULATING A SEQUENCE OF NON-ASSOCIATIVE OPERATIONS

(75) Inventors: Andre M. DeHon, Philadelphia, PA (US); Nachiket Kapre, Philadelphia, PA (US)

(73) Assignee: California Institute of Technology, Pasadena, CA (US)

( * ) Notice: Subject to any disclaimer, the term of this patent is extended or adjusted under 35 U.S.C. 154(b) by 1231 days.

(21) Appl. No.: 11/655,745

(22) Filed: Jan. 19, 2007

(65) Prior Publication Data
US 2007/0234128 A1 Oct. 4, 2007

Related U.S. Application Data

(60) Provisional application No. 60/761,804, filed on Jan. 23, 2006, provisional application No. 60/852,194, filed on Oct. 17, 2006.

(51) Int. Cl.
*G06F 7/42* (2006.01)
*G06F 7/38* (2006.01)
(52) U.S. Cl. ...................................... 708/505; 708/501
(58) Field of Classification Search .................. 708/501, 708/505
See application file for complete search history.

(56) References Cited

U.S. PATENT DOCUMENTS 7,212,959 B1 * 5/2007 Purcell et al. .................... 703/13
7,620,945 B1 * 11/2009 Song et al. ...................... 717/149

OTHER PUBLICATIONS

Schulte et al., "Parallel Saturating Multioperand Adders", pp. 172-179, 2000.*
Balzola et al., "Design Alternatives for Parallel Saturating Multioperand Adders", 2001 IEEE, pp. 172-177.*
I.S. Committee, IEEE Standard for Binary Floating-Point Arithmetic, IEEE, 345 East 47$^{th}$ Street, New York, NY 10017, Jul. 1985, ANSI/IEEE Std 754-1985.
C. McNairy et al. "Itanium 2 Processor Microarchitecture," IEEE Micro, vol. 23, No. 2, pp. 44-55, Mar./Apr. 2003.
K.S. Hemmert et al., "Open Source High Performance floating-point modules," in Proceedings of the IEEE Symposium on Field-Programmable Custom Computing Machines, Apr. 2006.
H. Leuprecht et al. "Parallel algorithms for rounding exact summation of floating point numbers," Computing, vol. 28, pp. 89-104, 1982.
S.M. Rump et al. "Accurate floating-point Summation," Faculty of Information and Communication Science, Hamburg University of Technology, Institute for Reliable Computing, Hamburg University of Technology, Schwarzenbergstrasse 95, Hamburg 21071, Germany, tech. rep. 05.12, Nov. 2005.
Z. Luo et al., "Accelerating pipelined integer and floating-point accumulations in configurable hardware with delaye addition techniques," IEEE Transactions on Computers, vol. 49, No. 3, pp. 208-218, Mar. 2000.

(Continued)

*Primary Examiner* — Chuong D Ngo
(74) *Attorney, Agent, or Firm* — Steinfl & Bruno LLP

(57) ABSTRACT

An apparatus and method that use an associative calculator for calculating a sequence of non-associative operations on a set of input data, comprising: using the associative calculator to calculate from the set of input data an evaluated value of each operation of said sequence as if the non-associative operations were associative operations; detecting if some of the evaluated values are erroneous; if there are erroneous evaluated values, correcting the erroneous evaluated values; and if there are no erroneous evaluated value, outputting as the result of the sequence of non-associative operations the evaluated value of the last operation of the sequence.

6 Claims, 11 Drawing Sheets

OTHER PUBLICATIONS

R.P. Brent et al. "A regular layout for parallel adders," IEEE Transactions on Computers, vol. 31, No. 3, pp. 260-264, Mar. 1982.

J. Sklanksy, "Conditional-sum addiction logic," IRE Transactions of Electronic Computers, vol. EC-9, pp. 226-231, Jun. 1960.

P. Kogge et al. "A parallel algorithm for the efficient solution of a general class of recurrence equations," IEEE Transactions on Computers, vol. C-22, No. 8, pp. 786-793, Aug. 1973.

T. Han et al., "Fast area-efficient VLSI adders," in $8^{th}$ Symposium of computer Arithmetic, pp. 49-56, Sep. 1987.

W.D. Hillis et al., "Data parallel algorithms," Communications of the ACM, vol. 29, No. 12, pp. 1170-1183, Dec. 1986.

R. Kelsey et al., "Revised report on the algorithmic language scheme," Higher-Order and Symbolic Computation, vol. 11, No. 1, Aug. 1998.

K. Underwood, "FPGAs vs. CPUs : Trends in Peak Floating-Point Performance," in Proceedings of the International Symposium on Field-Programmable Gate Arrays, Feb. 2004, pp. 171-180. Morgan Kaufmann.

* cited by examiner

METHOD AND A CIRCUIT USING AN ASSOCIATIVE CALCULATOR FOR CALCULATING A SEQUENCE OF NON-ASSOCIATIVE OPERATIONS

CROSS-REFERENCE TO RELATED APPLICATIONS

The present application claims the benefit of U.S. provisional Patent Application Ser. No. 60/761,804, filed on Jan. 23, 2006 for "Relaxation-based Optimistic Associativity for Floating-point Summation" by André DeHon and Nachiket Kapre; and of U.S. provisional Patent Application Ser. No. 60/852,194, filed on Oct. 17, 2006 for "Optimistic Parallelization of Floating-point Accumulation" by Andre, M. DeHon and Nachiket Kapre, the disclosures of both of which are incorporated herein by reference.

GOVERNMENT INTEREST

The research carried out in the subject application was supported in part by grant No. FA8750-05-C-0011 from the United States Air Force (Rome Laboratory). The U.S. Government may have rights in any patent issuing on this application.

BACKGROUND

1. Field

The present disclosure relates to the calculation of non-associative operations. In particular, it relates to methods and devices to perform the calculation in parallel for floating-point arithmetic, for example IEEE floating-point arithmetic.

2. Related Art

Scientific computing applications rely upon floating-point arithmetic for numerical calculations. For portability, almost all applications use the industry-standard floating-point representation IEEE-754[1] that provides uniform semantics for operations across a wide range of machine implementations. Each IEEE floating-point number has a finite-precision mantissa and a finite-range exponent specified by the standard, and the standard defines correct behavior for all operations and necessary rounding. The finite precision and range of floating-point numbers in the IEEE format requires rounding in the intermediate stages of long arithmetic calculations. This limited precision representation makes floating-point arithmetic non-associative.

As an illustrative example, FIGS. 1A and 1B show a case where associativity does not hold. If associativity held, one could perform the calculation either sequentially (FIG. 1A) or using a balanced reduce tree (FIG. 1B) and obtain the same result.

However, as FIGS. 1A and 1B show, the two different associations yield different results. For portability and proper adherence to the IEEE floating-point standard, if the program specifies the sequential order, the highly parallel, balanced "reduce" tree implementation would be noncompliant; it would produce incorrect results for some sets of floating-point values.

Consequently, portable floating-point computations must always be performed strictly in the order specified by the sequential evaluation semantics of the programming language. This makes it impossible to parallelize most floating-point operations without violating the standard IEEE floating-point semantics. This restriction is particularly troublesome since the pipeline depths of high-performance floating-point arithmetic units is tens of cycles, meaning common operations, such as floating-point accumulation, cannot take advantage of the pipelining, but end up being limited by the latency of the floating-point pipeline rather than its throughput.

For example, Conjugate Gradient (CG) is a scientific computing application whose parallelism can be severely limited by sequential accumulation. CG is a popular iterative numerical technique for solving a sparse, linear system of equations represented by $A \times x = b$, where A is a square $n \times n$ matrix and x and b are vectors of length n. Sparse Matrix-Vector Multiply (SMVM) is the dominant computation kernel in CG. In SMVM, one computes dot products between the rows of A and x which effectively requires one to sum the products of the non-zero matrix values with their corresponding vector entries in x. For sparse graphs, the number of non-zero entries per row can be unbalanced, with average rows requiring sums of only 50-100 products, and exceptional rows requiring much larger sums. If each dot product sum must be sequentialized, the size of the largest row can severely limit the parallelism in the algorithm and prevent good load balancing of the dot products. In addition to these dot-product sums, a typical CG iteration requires a few global summations with length equal to the size of the vectors, n. For large numerical calculations, n can easily be $10^4$, $10^5$ or larger; if these summations must be serialized, they can become a major performance bottleneck in the task, limiting the benefits of parallelism.

In view of the above, there is a need for a method that would allow parallelizing most floating-point operations without violating the standard IEEE floating-point semantics.

SUMMARY

According to a first aspect, a method of using an associative calculator for calculating a sequence of non-associative operations on a set of input data is provided, the method comprising:

using the associative calculator to calculate from the set of input data an evaluated value of each operation of said sequence as if the non-associative operations were associative operations;

detecting if some of the evaluated values are erroneous;

if there are erroneous evaluated values, correcting the erroneous evaluated values; and if there are no erroneous evaluated value, outputting as the result of the sequence of non-associative operations the evaluated value of the last operation of the sequence.

According to an embodiment, using the associative calculator to calculate from the set of input data an evaluated value of each operation of the sequence comprises:

breaking down each operation in a number of intermediate operations;

calculating in parallel the results of said intermediate operations; and using the results of the intermediate operations to calculate the evaluated value of the operations using the intermediate operations.

According to an embodiment, detecting if some of the evaluated values are erroneous comprises detecting differences between:

the evaluated value of any one operation of the sequence; and a calculation of the same value using:

the evaluated value of the previous operation of the sequence; and the input data not common to the calculation of the evaluated values of said operation and said previous operation.

According to an embodiment, correcting the erroneous evaluated values comprises:

generating corrected evaluated values by propagating said differences to the evaluated value of each operation; and detecting if some of the corrected evaluated values are erroneous and if so correcting the erroneous values until no corrected evaluated value is erroneous.

According to an embodiment, propagating said differences to the evaluated value of each operation includes using a parallel-prefix algorithm.

According to an embodiment, the non-associative operations are floating point summations, and using the associative calculator to calculate an evaluated value of each summation comprises:

breaking down each summation in a number of intermediate summations;

calculating in parallel the results of the intermediate summations; and using the results of the intermediate summations to calculate the evaluated value of each summation of the sequence.

According to an embodiment, detecting if some of the evaluated values are erroneous comprises calculating for the evaluated value of each summation of the sequence an error value equal to the difference between:

said evaluated value; and a sum of:

the evaluated value of the previous summation of the sequence; and the input data not common to the calculation of said evaluated value and the evaluated value of the previous summation of the sequence.

According to an embodiment, correcting the erroneous evaluated values comprises replacing the evaluated value of each summation of the sequence by a corrected evaluated value equal to a parallel summation of:

said evaluated value; and the error values calculated for the evaluated values of said summation and all the previous summations of the sequence.

According to an embodiment, correcting the erroneous evaluated values further comprises:

detecting if some of the corrected evaluated values are erroneous; and if so, correcting the erroneous values until no corrected evaluated value is erroneous.

According to an embodiment, the non-associative operations are floating point summations and the sequence of summations forms part of a dot product operation for calculating one of:

dot products in FIR filters;

dot products in IIR filters;

dot products in a Conjugate Gradient application a matrix-vector multiplication in a Conjugate Gradient application;

a matrix-vector multiplication in a GMRES application;

a matrix-vector multiplication in an Arnoldi application;

a matrix-vector multiplication in a Lanczos application;

a matrix-vector multiplication in a Markov Random Walk application;

a matrix-vector multiplication in a matrix-matrix multiplication.

According to an embodiment, the non-associative operations are floating point summations and the set of input data comprises products of non-zero matrix values and corresponding vector entries in an application calculating dot products between the rows of a matrix and a vector for implementing a Sparse Matrix-Vector Multiply operation for calculating one of:

a matrix-vector multiplication in a Conjugate Gradient application;

a matrix-vector multiplication in a GMRES application;

a matrix-vector multiplication in an Arnoldi application;

a matrix-vector multiplication in a Lanczos application;

a matrix-vector multiplication in a Markov Random Walk application;

a matrix-vector multiplication in a matrix-matrix multiplication.

According to a second aspect, a circuit for calculating a series of non-associative operations is provided, the circuit, comprising:

an associative calculator for calculating from a set of input data an evaluated value of each operation of said sequence as if the non-associative operations were associative operations;

a detector for detecting if some of the evaluated values are erroneous; and a corrector for correcting the erroneous evaluated values, if there are erroneous values.

According to an embodiment, the associative calculator is provided for:

breaking down each operation in a number of intermediate operations;

calculating in parallel the results of said intermediate operations; and using the results of the intermediate operations to calculate the evaluated value of each operation comprising the intermediate operations.

According to an embodiment, the operations of the sequence of operations and the intermediate operations are floating point summations, and the calculator comprises a plurality of adders for calculating in parallel the results of said intermediate operations.

According to an embodiment, the detector is provided for detecting if some of the evaluated values are erroneous by calculating, for the evaluated value of each summation of the sequence, an error value equal to the difference between:

said evaluated value; and a sum of:

the evaluated value of the previous summation of the sequence; and the input data not common to the calculation of said evaluated value and the evaluated value of the previous summation of the sequence.

According to an embodiment, the corrector for correcting the erroneous evaluated values, if there are erroneous values, comprises a plurality of adders for calculating in parallel, for the evaluated value of each summation of the sequence, a corrected evaluated value equal to a parallel summation of:

said evaluated value;

the error value calculated for the evaluated value of said summation; and each error value calculated for the evaluated value of each previous summation of the sequence.

According to an embodiment, the corrector and the associative calculator share a same plurality of adders.

According to an embodiment, the plurality of adders comprises a network of statically-scheduled, pipelined floating-point sub-adders.

According to an embodiment, the corrector is further provided for:

detecting if some of the corrected evaluated values are erroneous; and if so, correcting the erroneous values until no corrected evaluated value is erroneous.

According to an embodiment, the non-associative operations are floating point summations and the circuit forms part of a processing unit capable of calculating dot products or Matrix-Vector operations.

According to an embodiment, the associative computation is performed as a parallel-prefix operation using a Brent-Kung, Sklansky, or hybrid parallel-prefix design. The hybrid design starts with a Brent-Kung parallel-prefix tree and modifies it to reduce the length of the sequentially dependent path in the prefix tree by adding additional operations to calculate critical terms earlier than in a pure Brent-Kung design; the hybrid design, nonetheless, uses fewer operations than a Sklansky design.

According to an embodiment, the adders of the plurality of adders are controlled according to a hybrid parallel-prefix design that completes in fewer cycles than Brent-Kung or Sklansky when scheduled on a fixed number of processing elements.

According to an embodiment, the hybrid parallel-prefix design is obtained by:

Computing the number of free slots in the Brent-Kung design;

Adding operations to the Brent-Kung design to reduce the length of the sequentially dependent path;

Constraining the number of operations added to be lower than the number of identified free slots.

According to the present disclosure, it is observed that floating-point operations are "mostly" associative. This observation is exploited to parallelize floating-point accumulation using a form of optimistic concurrency. In the present disclosure, an "optimistic" associative approximation to the sum is first computed and then computation is relaxed by iteratively propagating errors until the correct sum is obtained.

According to the present disclosure, this computation is for example mapped to a network of 16 statically-scheduled, pipelined, double-precision floating-point adders on a Virtex-4 LX160 (−12) device where each floating-point adder runs at 296 MHz and has a pipeline depth of 10.

Reference is also made to the documents cited in Annex 4, incorporated herein by reference in their entirety.

DETAILED DESCRIPTION

Throughout the present disclosure reference will also be made to the enclosed Annexes 1, 2, 3 and 4, which make part of the present disclosure.

A common technique for parallelizing associative operations is parallel-prefix reduction. It allows to compute the result of an associative function over N inputs in $O(\log(N))$ time. The computation also generates N−1 intermediate values as part of the process. For example, a parallel-prefix accumulate on an input sequence [x1, x2, x3, x4] generates an output sequence [x1, (x1+x2), (x1+x2+x3), (x1+x2+x3+x4)] which consists of 3 intermediate sums of the input as well as the final sum of all 4 inputs.

Several styles of parallel-prefix are found in practice (e.g. Brent-Kung [7], Sklansky [8], Kogge-Stone [9], Han-Carlson [10]). The exact number of calculations required depends on the style of prefix used, but is usually more than the simple, serial sum. Parallel-prefix allows us to tradeoff extra computation for lower latency generation of results. A key requirement, however, is that the reducing function be associative. Consequently, this technique does not directly apply to floating-point accumulation.

Figure 2:
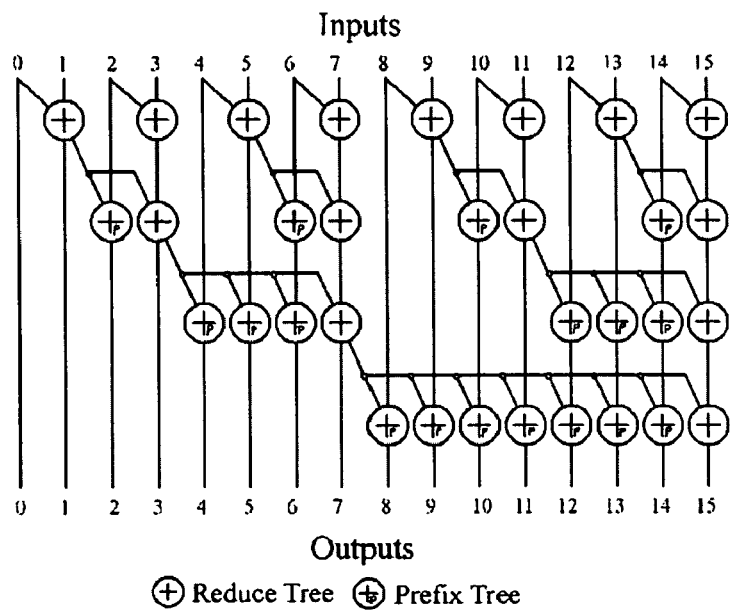
FIG. 2 illustrates a Sklansky Parallel-Prefix tree.

As an illustration, FIG. 2 shows a Sklansky adder, wherein the final result is computed by recursively adding pairs of operands in $\log_2(N)$ steps. This is the "reduce" tree. The remaining N−1 values are computed in the idle slots, at each stage, in what is called herafter a "prefix" tree. The Sklansky-style parallel-prefix operation requires N/2 additions at each stage of the tree. Since all additions at a given stage in the tree are completely independent, they can be run in parallel. This is what makes this technique attractive for parallelizing associative functions.

Figure 3:
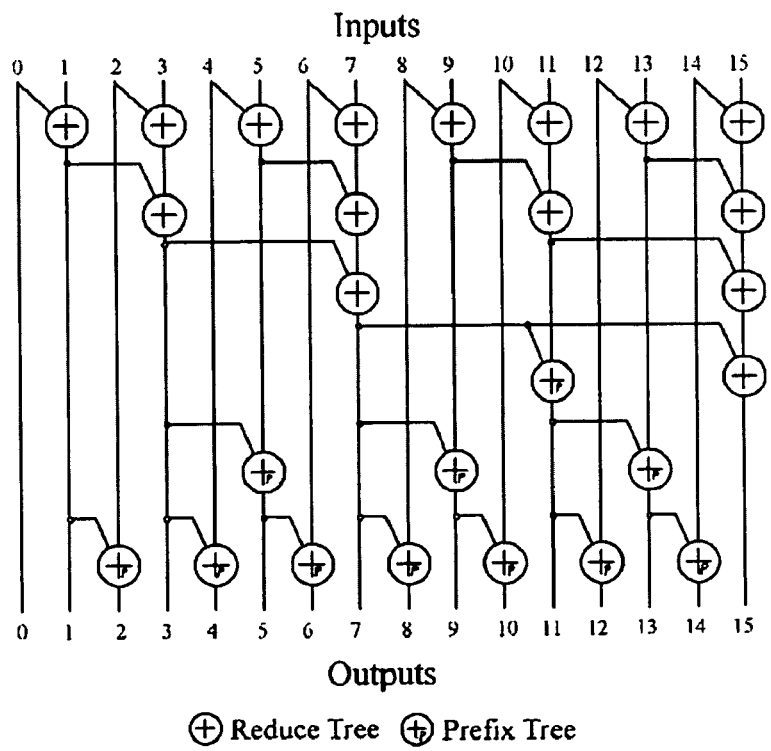
FIG. 3 illustrates a Brent-Kung Parallel-Prefix tree.

FIG. 3 shows a Brent-Kung adder that has a same "forward reduce" tree as the Sklansky adder. However, the final N−1 values are computed differently with a "reverse prefix" tree which requires less than N operations but takes an additional $\log_2(N)-1$ steps. Thus, the total number of operations in Brent-Kung adders is just under 2N, meaning it requires only twice as many additions as the simple, sequential sum.

The Sklansky adder has the advantage of computing the required results with low latency, while the Brent-Kung adder does the same with fewer operations and a deeper tree. As detailed hereafter, according to an embodiment of the present disclosure, an adder uses a prefix tree that borrows the best features from these two schemes. A tutorial discussion of parallel-prefix computations can be found in [11], [12].

Figure 1A:
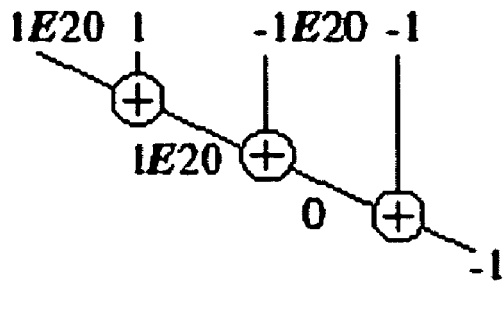
FIGS. 1A and 1B illustrate the non-associativity of IEEE floating-point arithmetic.
Figure 1B:
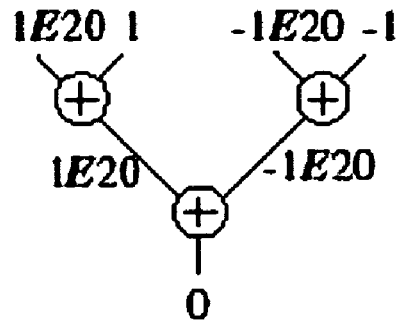

As illustrated above in relation with FIGS. 1A and 1B, trivial associativity could fail to yield the correct answer for floating-point accumulation. This is unfortunate, since associativity could allow exploiting parallelism to speedup the summation. However, the inventors have noted that many additions will not suffer from this lack of associativity, and most will suffer only slightly. Thus, most of the time, the associative answer will be a close approximation to the correct answer.

It is noted that if one does not provide IEEE floating point semantics, the results will differ from machine-to-machine creating additional complexity for the developer and user.

The inventors have noted that one can retain correct semantics and still exploit associativity using the following idea: using an associative calculation to approximate the result, and recompute only a portion of the accumulation that is detected to be erroneous. This allows sequentializing only the associativity exceptions in the result rather than the entire accumulation.

Figure 4:
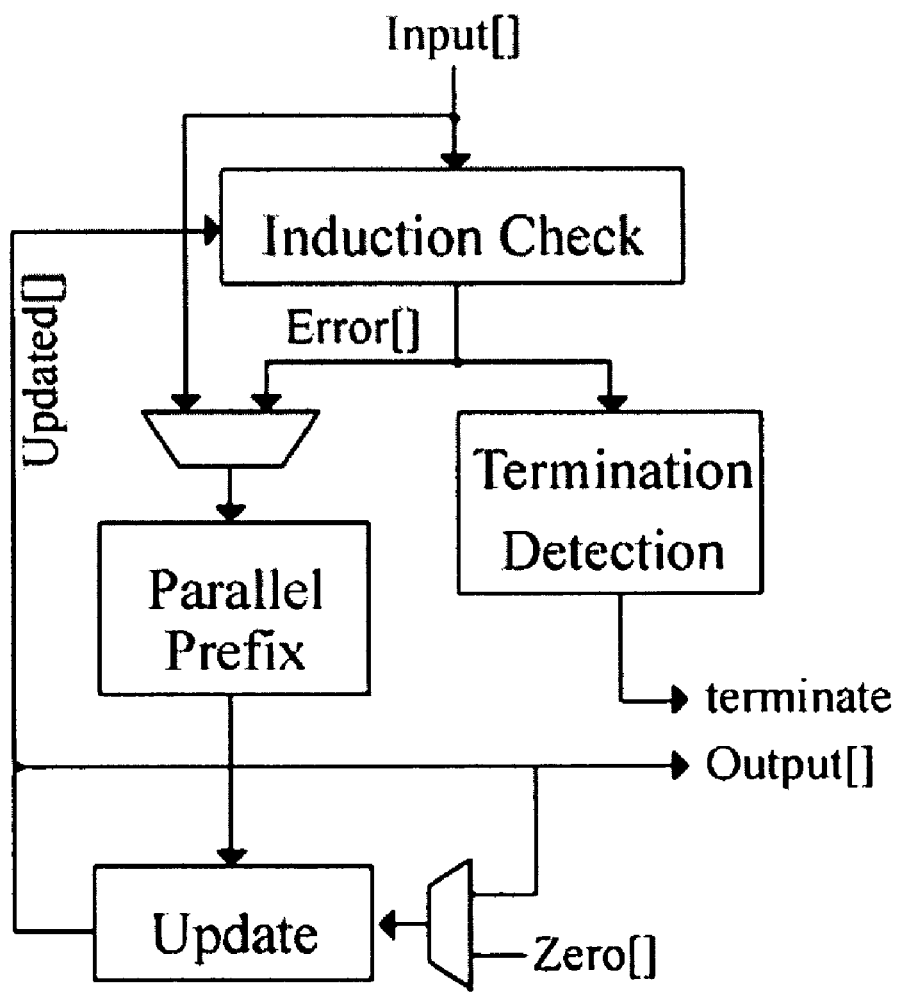
FIG. 4 shows an algorithm for implementing an optimistic-associativity floating-point accumulation according to an embodiment of the present invention.

FIG. 4 shows a block diagram illustrating an algorithm for implementing a floating point accumulation according to the above idea. An example of pseudocode for the algorithm of FIG. 4 is shown in Annex 1. Such floating point accumulation is hereafter called an optimistic-associativity floating-point accumulation, since it is based on the optimistic assumption that most additions will not suffer from a lack of associativity.

The algorithm comprises:

1) computing a parallel-prefix sum Prefix[ ] as an approximation to the required sum from the set of inputs Inputs[ ]; For n+1 inputs, Input[0] to Input[n]:
Prefix[0]=Input[0];
Prefix[1]=Input[0]+Input[1];
Prefix[2]=Input[0]+Input[1]+Input[2];
Prefix[n]=Input[0]+Input[1]+Input[2]+ . . . +Input[n];

In the above formulae, the symbol "=" indicates that Prefix[i] (for i=[2, n]) is only an approximation of Input[0]+Input[1]+ . . . +Input[i]. The value of the approximation depends on the order in which the parallel-prefix sum is calculated. However, as detailed hereafter, any eventual difference between the approximation of the sum and the sequential value of the sum is ultimately cancelled.

Figure 4A:
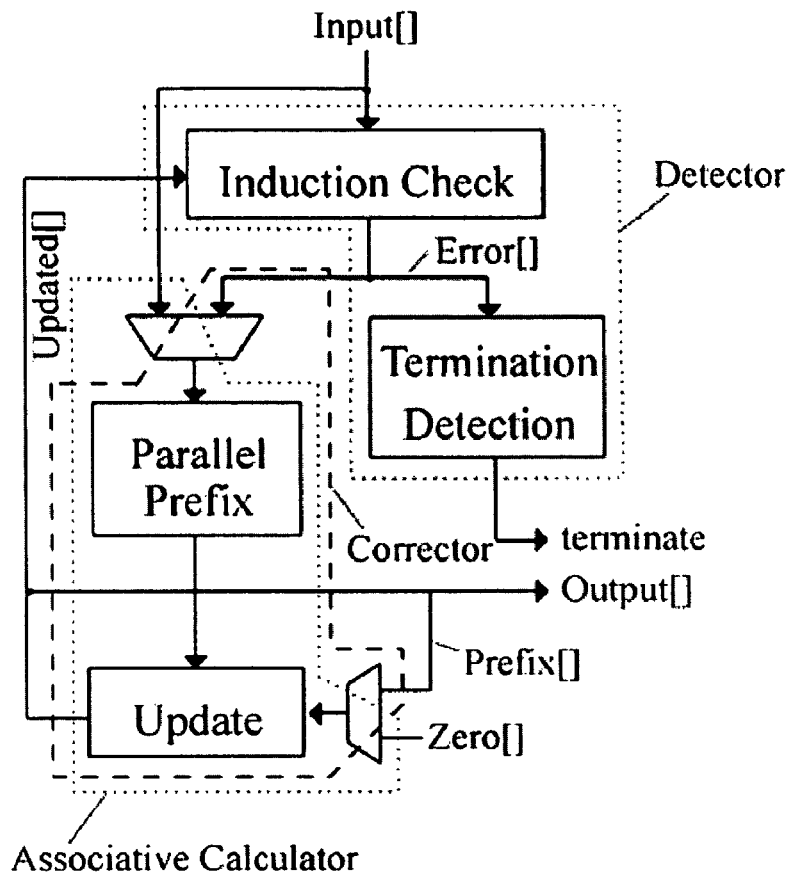
FIG. 4A shows an embodiment of a circuit for calculating a sequence of non-associative operations as shown in the block diagram of FIG. 4.

According to an embodiment, a circuit as shown in FIG. 4A is provided for calculating a sequence of non-associative operations according to the block diagram of FIG. 4. For example, the circuit may comprise an associative calculator having a Parallel Prefix calculator for calculating from the Input[ ] values the evaluated value Prefix[ ] of each operation of said sequence, as detailed above.

2) then, detecting completion by implementing an induction step, where the validity of the sum is checked at each position Prefix[i] in the associative sum vector Prefix[ ], using the associative sum at the previous position Prefix[i−1] and Input[i]: Error[i] is calculated with Error[i]=Prefix[i]−(Prefix[i−1]+Input[i]); and with Error[0]=0;

This is similar to the induction step of mathematical proofs using induction.

Figure 4B:
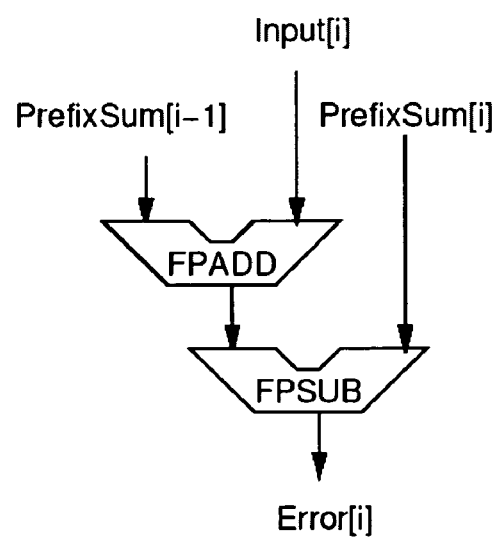
FIG. 4B shows an embodiment of an Induction Check portion of the detector circuit of FIG. 4A.

According to an embodiment, the circuit of FIG. 4A further comprises a detector for detecting if some of the evaluated values Prefix[ ] are erroneous. FIG. 4B shows an embodiment of a portion of a detector circuit for detecting if some of the evaluated values are erroneous. The portion of the detector circuit illustrated in FIG. 4B calculates the Error[ ] values and implements the "Induction Check" block shown in FIG. 4A.

3) If every induction step is error free (Error[i] is 0 for all i), then the final sum is known to be correct.

Figure 4C:
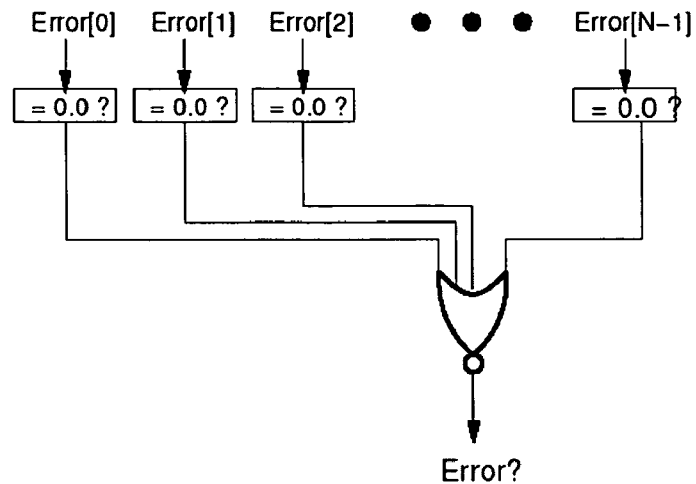
FIG. 4C shows an embodiment of a Termination Detect portion of the detector circuit of FIG. 4A.

FIG. 4C shows an embodiment of a portion of the detector circuit of FIG. 4A. The portion of the detector circuit illustrated in FIG. 4C allows checking if every induction step is error free and implements the "Termination Detection" block shown in FIG. 4A.

4) If there are any errors in the induction step (Error[i]≠0), the errors are propagated back into the associative sum vector Prefix[ ] to correct the result. This is done by first performing a parallel prefix on the error vector Error[ ] to generate ErrPrefix[ ]:
ErrPrefix[0]=Error[0];
ErrPrefix[1]=Error[0]+Error[1];
ErrPrefix[2]=Error[0]+Error[1]+Error[2];
ErrPrefix[n]=Error[0]+Error[1]+Error[2]+ . . . +Error[n];

As in 1) above, the symbol "=" indicates that ErrPrefix[i] (for i=[2, n]) is only an approximation of Error[0]+Error[1]+ . . . +Error[i]. The value of the approximation depends on the order in which the parallel-prefix sum is calculated, but the algorithm is trying to drive these terms to 0, and the order does not matter when all values are the same.

Figure 4D:
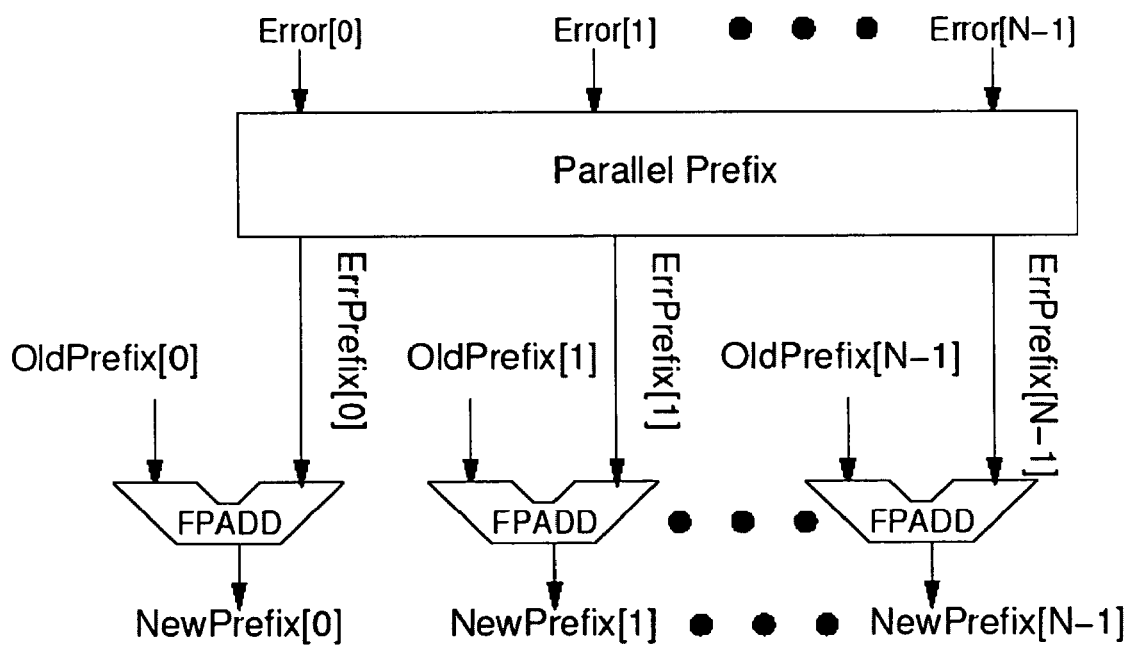
FIG. 4D shows an embodiment of the corrector circuit of FIG. 4A.

According to an embodiment, the circuit of FIG. 4A is provided with a corrector as shown in FIG. 4D for correcting the erroneous evaluated values, wherein the corrector can include a Parallel Prefix calculator to calculate the above ErrPrefix[ ] values as detailed above. According to an embodiment, the associative calculator and the corrector of the circuit of FIG. 4A share a same parallel prefix calculator.

5) The resulting error correction vector ErrPrefix[ ] is then added into Prefix[ ] to improve the approximation of the sequential sum.
Prefix[i]=Prefix[i]+ErrPrefix[i];

According to an embodiment, the corrector of FIG. 4D comprises an "Update" circuit to calculate the new Prefix[ ] values (NewPrefix[ ]) from the previous Prefix[ ] values (OldPrefix) and the Error[ ] values. It will be noted that, in an embodiment where the associative calculator and the corrector of the circuit of FIG. 4A share a same Parallel Prefix calculator, the circuit of FIG. 4A may use a multiplexer to direct either the Input[ ] values or the Error[ ] values into the Parallel Prefix calculator, and a multiplexer to direct either a null value or the Prefix[ ] values into the Update circuit, depending on whether the Parallel Prefix calculator and the Update circuit are used by the associative calculator or the corrector.

6) Since error propagation is also a floating-point operation and therefore non-associative, the result of this update might still not be correct. Hence, the algorithm is repeated iteratively from Step 2 until convergence is detected; that is, the error vector is composed entirely of 0 entries.

This solution is "optimistic" in that it is optimistically assumed that the operation can be performed associatively. However, the validity of that assumption is checked, and the operation is recalculated when the assumption is wrong. The solution is "relaxing" in that the approximation is continually updated with better information until it converges.

This is an example of the "Common Case" principle in system engineering. The common case is that the operations are associative to the required precision. Rather than penalizing all the cases, the associative case is handled efficiently. When it fails, the failure is detected and the algorithm is iterated until it converges. In the worst case, this algorithm reduces to full sequentialization. That is, there is an error at the position following the one that was previously corrected and one sequential addition step is perfectly resolved in each iteration.

This simple observation allows concluding that convergence is always guaranteed. If it were to only resolve one position on each iteration, the algorithm would be much slower and less efficient than a conventional, sequential addition. However, as it will be detailed hereafter, this worst case never happens in practice.

The computational requirement and latency of the above algorithm will now be evaluated assuming an unbounded amount of hardware.

Assuming a Sklansky-style parallel-prefix computation (as illustrated in FIG. 2) the parallel-prefix sum (Step 1 and 4 in Annex1) requires $N/2 \cdot \log_2(N)$ floating-point additions with a critical path of $\log_2(N)$ sequential floating-point additions. Operations at a given level in the prefix tree (See FIG. 2) can be executed in parallel.

$$\text{Nprefix} = (\tfrac{1}{2}) \times N \times \log_2(N) \quad (1)$$

$$\text{Tprefix} = \log_2(N) \times \text{Tfpadd} \quad (2)$$

The Induction computation (Step 2 in Annex 1) requires N additions and N subtractions. The latency of this step is only two floating-point operations (one add followed by one subtract) since all operations can be performed in parallel.

$$\text{Ninduction} = 2 \times N \quad (3)$$

$$\text{Tinduction} = 2 \times \text{Tfpadd} \quad (4)$$

Termination Detection (Step 3 in Annex 1) involves a simple comparison to the constant zero on each entry in the error vector followed by a trivial AND reduce. These can also be performed in parallel and, as detailed hereafter, they can be overlapped with the next iteration so that they do not contribute to the total latency of each "iteration".

$$\text{Ntermination} = N \quad (5)$$

$$\text{Ttermination} = (\text{Tfpadd} + \log_2(N) \times T_{AND}) \quad (6)$$

Finally, the Update operations (Step 5 in Annex 1) requires N additions to add the error vector into the prefix sum. These additions can be fully parallelized.

$$\text{Nupdate} = N \quad (7)$$

$$\text{Tupdate} = \text{Tfpadd} \quad (8)$$

If k iterations are performed, then the total number of floating-point operations is:

$$N\text{total} = k(N\text{prefix} + N\text{induction} + N\text{update}) \quad (9)$$

$$N\text{termination}$$

$$\approx N(1/2 \times \log_2(N)k + 3k)$$

Thus, the above corresponds to $(\tfrac{1}{2} \times \log_2(N)k + 3k)$ times as much work as the simple, sequential summation. However, these operations can be parallelized and, if scheduled properly, can outperform the sequential summation. Assuming complete parallelization, the total number of cycles required will be:

$$T\text{total} = k(T\text{prefix} + T\text{induction} + T\text{update}) + T\text{termination} \quad (10)$$

$$\approx k(\log_2(N) + 3) \times T\text{fpadd}$$

The skilled reader will note that the use of the notation "≈" in equation (10) and in the present equation set has its regular meaning of "approximately equal to", and thus differs slightly from the sign "=" as defined above (i.e. there is no limited-precision floating-point significance to these equations; they are approximate in the normal mathematical, real-number sense).

For reference, the sequential sum will take:

$$T\text{seqsum} = N \times T\text{fpadd} \quad (11)$$

As the size of the sum (N) gets larger, the forced sequentialization in the prefix sum (the log term in Equations 1 and 10) becomes less significant and greater speedups (Tseqsum/Ttotal) are possible. This ideal estimate of speedup can be represented as:

$$Speedup = Tseqsum / Ttotal \quad (12)$$

$$= (N \times Tfpadd) / [k(\log_2(N) + 3) Tfpadd]$$

$$\approx N / [k \times \log_2(N)]$$

For interesting sizes of N, it would typically be impractical to provide hardware for complete parallelization of the algorithm. Hence, limited amounts of hardware are preferably used. The exact number of cycles required for the mapping to finite hardware will depend on the efficiency of the scheduling algorithm used. Nonetheless, simple analytical equations can be written for the upper and lower bounds assuming perfect scheduling and a particular parallel-prefix strategy. For the bounds here, it is assumed that a Sklansky-style parallel-prefix summation is used. For the upper-bound computation, it is assumed that the floating-point adder latency and the communication latency between adders cannot be hidden.

$$\text{Tupper}(N, PE) = \Sigma_{i=1}^{\log 2(N)} (N/[2 \times PE] + \text{Tfpadd} + \text{Tcomm}) + 3(N/PE + \text{Tfpadd}) \quad (13)$$

One will note that in a Sklansky-style parallel-prefix summation, every stage has the same number of additions. So, the summation in the above equation is actually unnecessary and can be replaced by a multiplication by $\log_2(N)$ to give:

$$\text{Tupper}(N, PE) = \log_2(N) \times (N/[2 \times PE] + \text{Tfpadd} + \text{Tcomm}) + 3(N/PE + \text{Tfpadd}) \quad (13b)$$

For the lower-bound computation it is assumed that the operations can be overlapped and only the maximum of the latency and throughput bound at each stage are charged.

$$\text{Tlower}(N, PE) = \Sigma_{i=1}^{\log 2(N)} (\max(N/[2 \times PE], (\text{Tfpadd} + \text{Tcomm}))) + 3(\max(N/PE, \text{Tfpadd})) \quad (14)$$

Here, too, the summation can be replaced by a multiplication by $\log_2(N)$ to give:

$$\text{Tlower}(N, PE) = \log_2(N) \times (\max(N/[2 \times PE], (\text{Tfpadd} + \text{Tcomm}))) + 3(\max(N/PE, \text{Tfpadd})) \quad (14)$$

Figure 5:
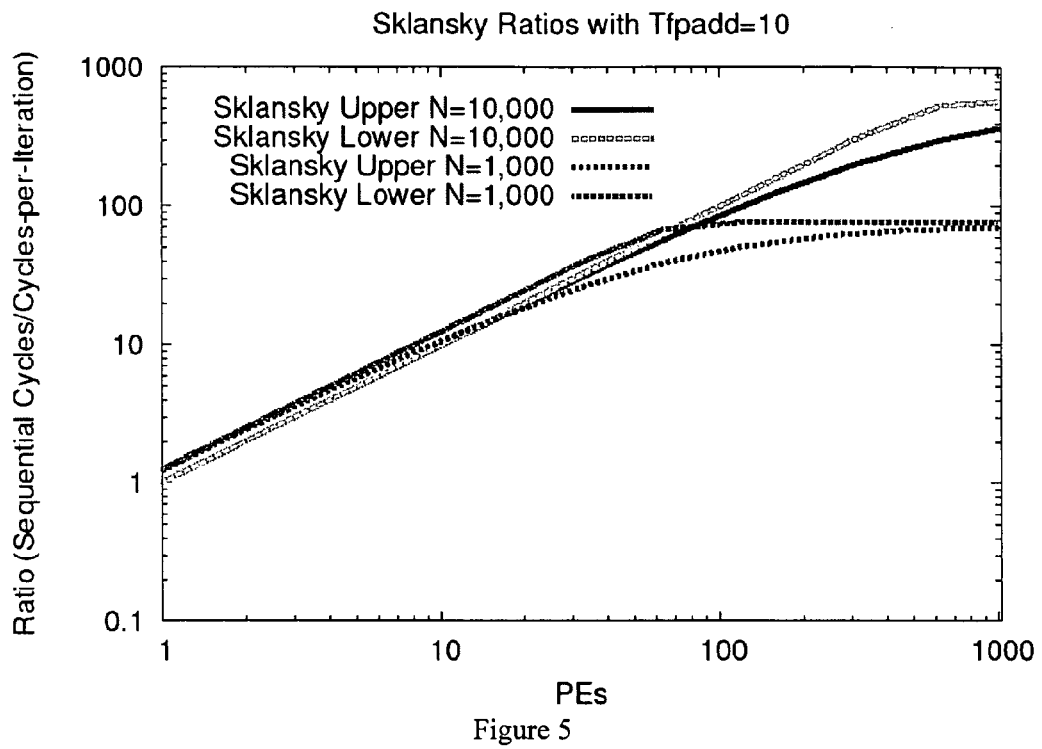
FIG. 5 shows cycles ratios between sequential calculations and the algorithm of FIG. 4.

FIG. 5 shows ratios between the sequential case (Tseqsum) and the upper and lower bounds for various N as a function of the number of processing elements, PE, assuming Tfpadd=10. This ratio can also be interpreted as the breakeven number of iterations k. If k is less than this ratio, the parallel case on the associated number of PEs is faster, otherwise the parallel case is slower than the sequential case. One will note that these bounds apply only for the pure-Sklansky scheme. As will be detailed later, T can be reduced by decomposing the computation. The tighter schedule enables greater speedups and increases the breakeven k.

As FIG. 5 suggests, a key question to address is to determine how many iterations it does typically take for the algorithm to converge. The inventors have empirically characterized the iterations required using both randomly generated data and data from a Conjugate Gradient benchmark.

First, random datasets were used for initial analysis of the benefits of the proposed algorithm. Floating-point numbers were generated by randomly picking the sign, mantissa, and exponents. The exponent was varied within different ranges to understand the impact of the range on the number of iterations required by the algorithm. Annex 2 specifies the algorithm used for generating the random data sets.

The main limitation of random data sets is their inability to correctly model the natural correlation of floating-point numbers in real applications. After encouraging initial results using random data, real data were generated from a CG implementation and used for the experiment.

Matrices from the Matrix Market [13] benchmark were used for the experiments; each matrix ran for 1000 iterations. From the simulation results, only those floating-point sums of the length under test, N, or greater were selected; for homogeneous presentation and analysis of results, only the first N numbers in cases where the actual sums were longer than N were summed.

To evaluate convergence, a program written in the algorithmic language Scheme [14] was written for the parallel-prefix algorithm. The Scheme Language supports a faithful implementation of the IEEE-754 standard. Sklansky-style parallel-prefix addition were implemented for summing N numbers ($64 \leq N \leq 1024$), and the hybrid prefix style described hereafter and shown in Annex 3 was used for the 1024 input accumulation. The above datasets were used to compute the number of iterations required for termination of the optimistic algorithm.

Figure 6:
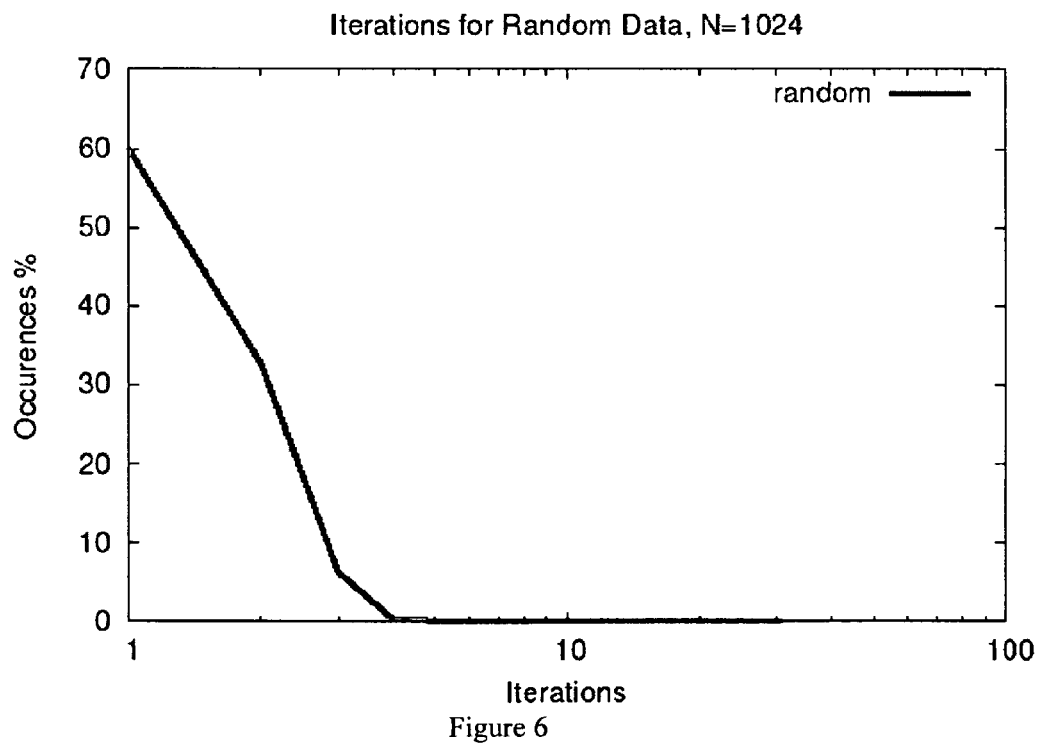
FIG. 6 shows the distribution of iterations required for a specific set of randomly-generated floating-point accumulations for the algorithm of FIG. 4.

FIG. 6 shows the distribution of iterations required for a set of 1000 randomly-generated floating-point accumulations of length 1024. It can be observed that, in most cases, the iterations required are indeed small; that is, roughly three iterations are required for the average case, while 90% of all cases require <5 iterations. With an average of three iterations, FIG. 5 suggests the parallel scheme is faster when PE>4.11

To illustrate why this works, the sum:

$$1.23E1 + 8.43E5 + 3.76E4 + 6.5E0 + 2.4E30 + 7.8E25$$

will now be considered.

Summing the first 4 numbers gives 8.806188E5. Adding those to 2.43E30 gives 2.43E30 because of the limited 53-bit mantissa precision for double-precision floating point. The sum of the first 4 numbers is actually irrelevant. Consequently, 2.43E30 can safely be added to 7.8E25 to provide the result. More importantly, non-associativity errors before the 2.43E30 are actually irrelevant to the final result and can be ignored.

The above example is an extreme case where all the precision of a particular prefix does not contribute to the final result. In general, only part of the precision of a prefix may be needed. As long as the errors in the prefix due to associativity are below the precision required form the prefix, there is no need to compute the result perfectly.

Similar observations can be made about the suffix when its magnitude is small compared to some prefix. Consequently, the algorithm tends to iterate only to the extent that non-associative precision errors actually matter to the final result. The length of the dependency chains to resolve these non-associative errors is typically short compared to the sequential length of the original summation.

It is reasonable to expect that there may be a relation between number of iterations required for the algorithm to converge and the range of the exponents in the summation sequence. If the range of exponents is defined as:

$$\text{range} = \log_2(\max_i(|x_i|)) - \log_2(\min_i(|x_i|)) \quad (15)$$

Figure 7:
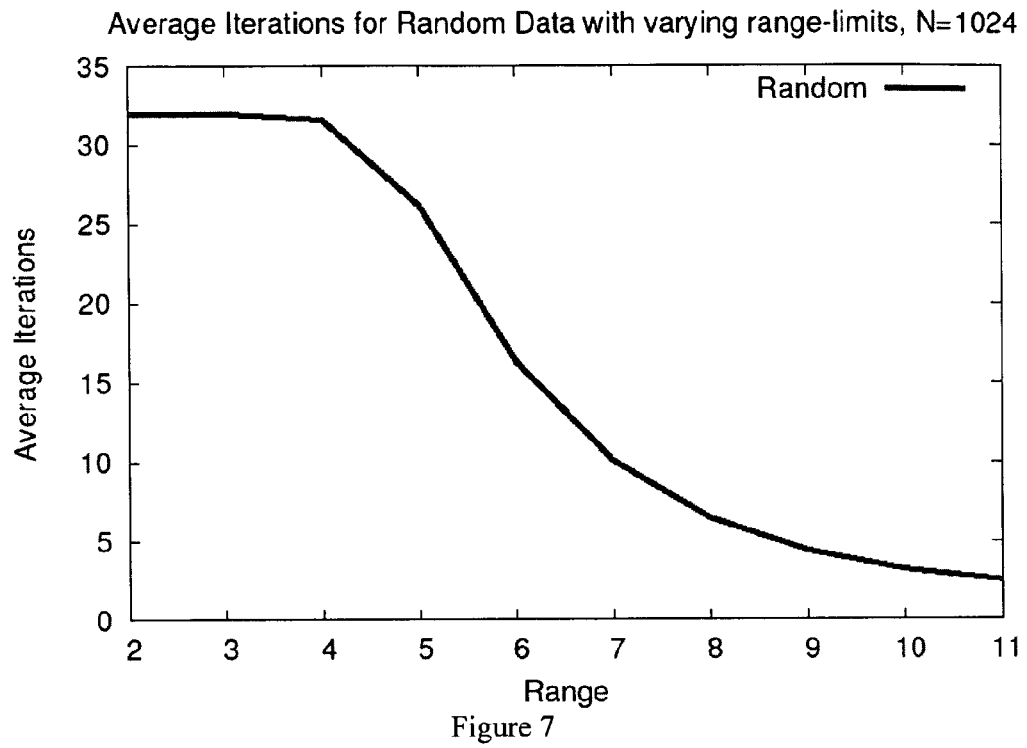
FIG. 7 shows the evolution of the average number of iterations required with respect to the range of random numbers for the algorithm of FIG. 4.

FIG. 7 shows that the number of iterations required increases as the range of random numbers appearing in each summation is limited. With limited range floating-point numbers, there are fewer chances for a prefix or suffix to dominate the sum; that is, with all numbers close in range, much of the precision of each floating-point addition in the accumulation has an impact on the final sum. As a result, the impact of the non-associative floating-point additions increases, resulting in an increase in number of iterations in an algorithm as disclosed. In the worst case, for small ranges, the average number of iterations is 32 when summing 1024 numbers. Fortunately, in practice this worst-case of 32 iterations is not needed.

Figure 8:
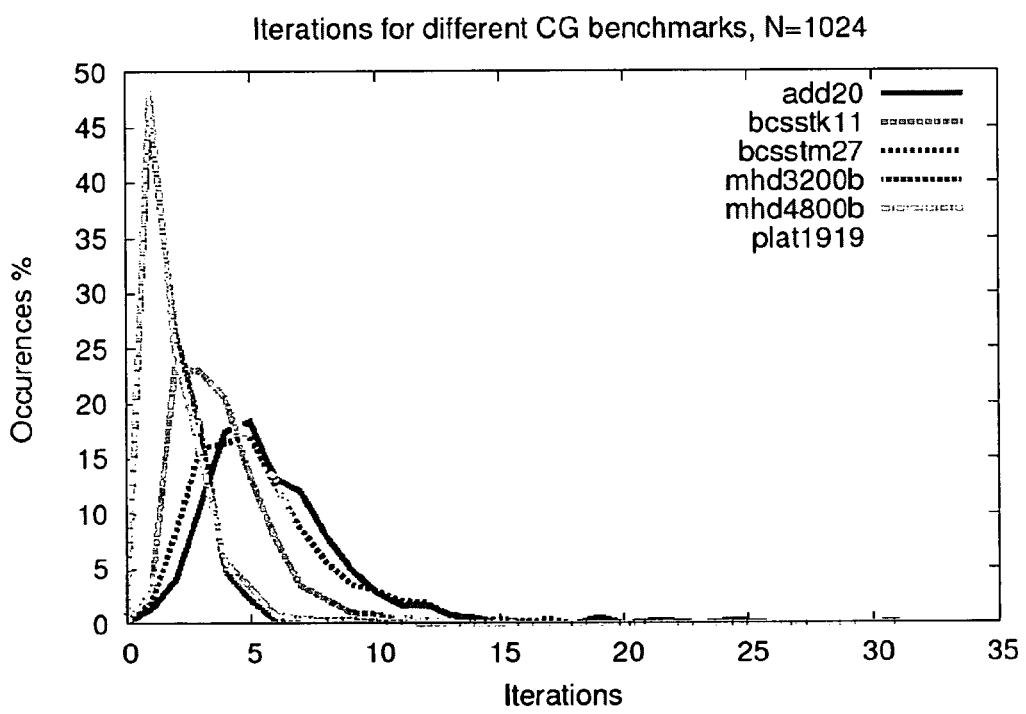
FIG. 8 shows a distribution of iterations required for different CG graphs, for the algorithm of FIG. 4.

FIG. 8 shows a distribution of iterations required for different CG graphs for variety. It can be observed that the average number of iterations required in most cases is between 3 and 8. The iterations required are similar to random data with a limited range of 7-9.

Figure 9:
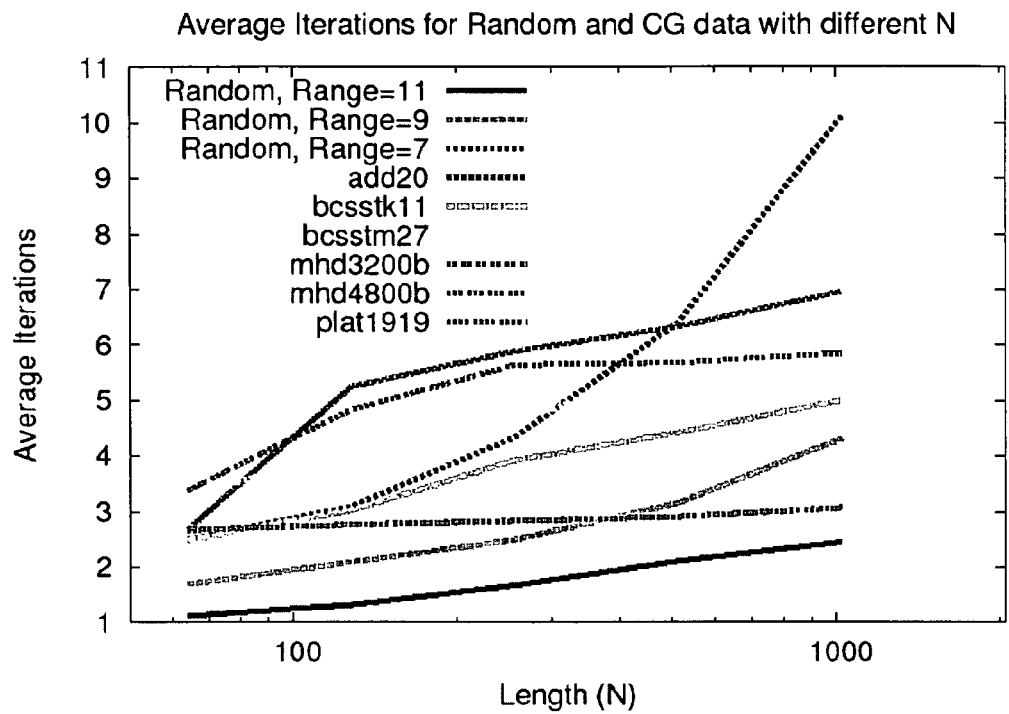
FIG. 9 shows the evolution of the average number of iterations with the length of the sum, N, for the algorithm of FIG. 4.
Figure 10:
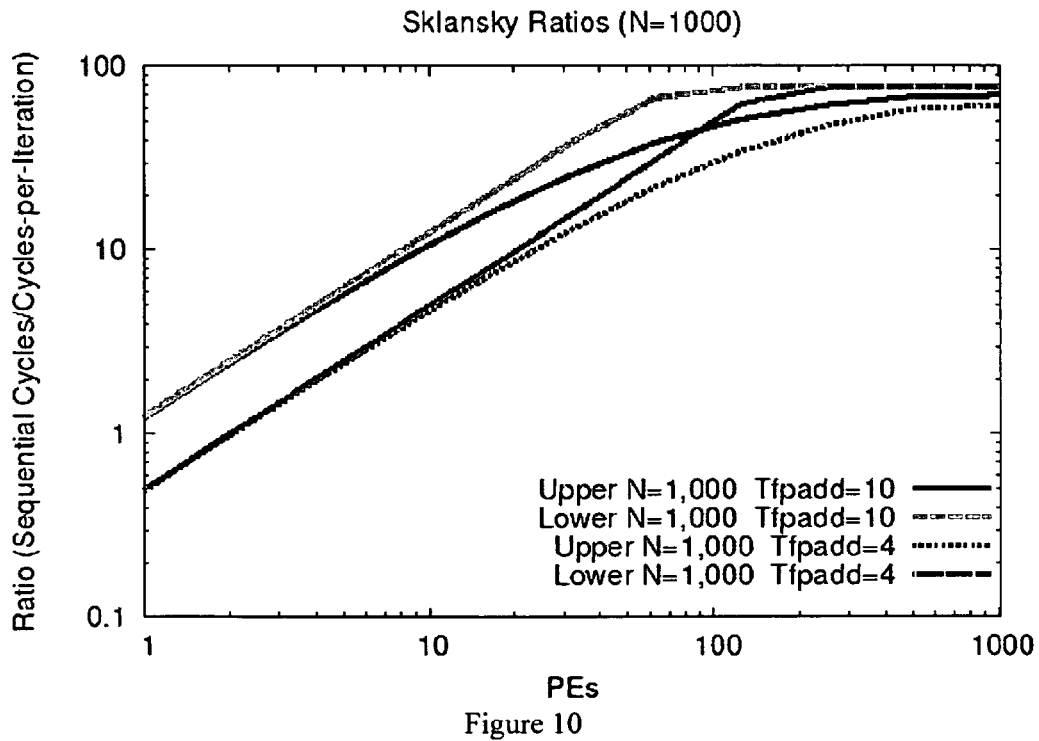
FIG. 10 shows an estimation of the speedup for the algorithm of FIG. 4.

FIG. 9 shows that the average number of iterations, k grows slowly with the length of the sum, N. The slow growth suggests a greater opportunity for speedups for longer sums. FIG. 9 suggest an average k<7 for sequences of length 1000. Adding these to upper and lower bound estimates (Equations 13 and 14), speedup can be estimated as a function of PEs as shown in FIG. 10.

Figure 11:
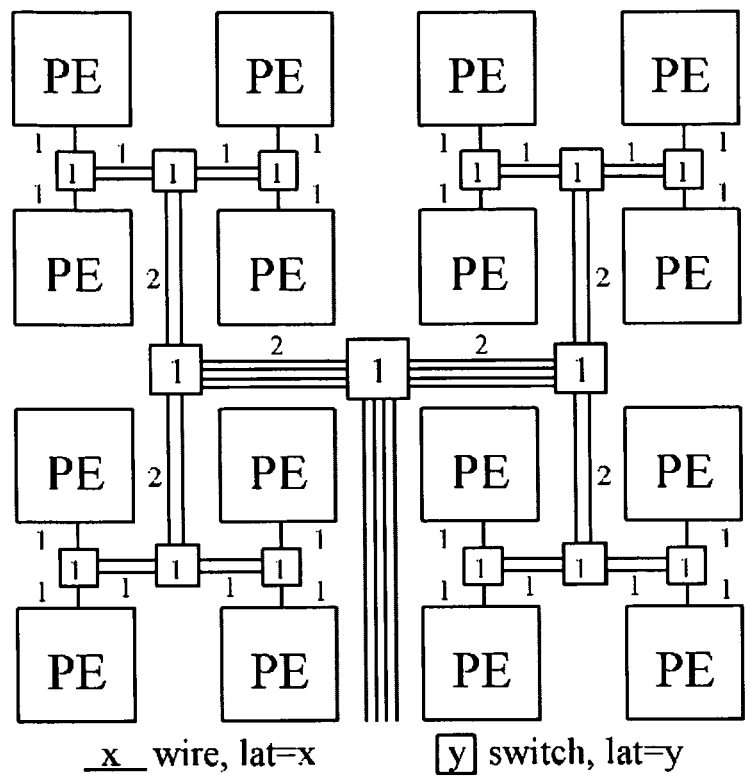
FIG. 11 shows a statically-routed butterfly fat-tree network used to demonstrate concretely the benefits of the algorithm of FIG. 4.

FIG. 11 shows a statically-routed butterfly fat-tree network used to demonstrate concretely the benefits of an algorithm as presently disclosed. A length 1024, double-precision floating-point addition is mapped to an FPGA implementation with 16 floating-point processing elements (PEs) interconnected via a statically-routed butterfly fat-tree network. According to an embodiment, the parallel Prefix calculator of FIGS. 4A and 4C can be implemented using a network as shown in FIG. 11.

The raw floating-point performance of FPGAs is beginning to rival or surpass general-purpose processors with hardware floating-point units [15].

However, parallelism and deep pipelining are necessary to fully exploit the floating-point capacity of these FPGAs (e.g. Tfpadd=10-14 in [3]). Consequently, techniques such as disclosed in the present application provide a path to exploit this potential performance.

According to an embodiment of the present disclosure, each PE has a statically-scheduled, double-precision floating-point adder and multiplier from the Sandia library [3] and an integer adder. The floating-point adder takes 571 Virtex-4 slices while a floating-point multiplier takes 801 slices and runs at 296 MHz on a Virtex4-LX160 (speed-grade −12) device. Multipliers and integer adders are not needed for the simple accumulation, but are included according to an embodiment because they would typically be required by algorithms which precede the summation. For example, in a dot product, the multipliers would compute the products, then feed the products into the parallel summation. The integer adders also find use for simple comparisons.

According to an embodiment of the present disclosure, each PE also has tightly coupled local memory stores built out of Virtex Block RAMs that hold a portion of the vector to be accumulated, intermediate sums, and the instructions to implement the prefix schedule.

According to an embodiment of the present disclosure, a 64-bit wide, statically routed communication network is used and allows each of the 16 PEs to produce or consume a double-precision number on each cycle. The key timing parameters for this implementation are summarized in Table I below.

TABLE I

| Variable | Value | Description |
| --- | --- | --- |
| Tfpadd | 10 | Pipeline latency of a Floating-point addition |
| Tcomm | 3 | Communication latency in same-2 tree |
|  | 7 | Communication latency in same-4 tree |
|  | 13 | Communication latency in same-8 tree |
|  | 19 | Communication latency in same-16 tree |

Achievable speedups can be computed based on these latency figures.

The time complexity of an algorithm as disclosed, when mapped to a finite number of floating adders (PEs), has been described above in relation with implementations of an embodiment of the algorithm presently disclosed using limited amount of hardware. Theoretical lower and upper bounds have been computed for the total cycles required as shown in Equations 13 and 14. A hybrid prefix strategy and schedule that improves upon the simple Sklanskly lower bound in Equation 14 when scheduling floating-point sums of length 1024 onto 16 PEs will now be outlined. A key idea is to reduce the total number of floating-point operations by decomposing the computation into a series of hierarchical Sklanksy-prefix steps. This avoids computing the full operations at each step in the prefix tree as shown in FIG. 2, but produces only a partial set of results.

The full prefix semantics is preserved by computing the rest of the intermediate prefix sums from the partial results produced by the hierarchical decomposition.

The set of 1024 floating-point numbers is distributed such that each of the 16 PEs gets a sequence of 64 numbers.

The PEs and the network are then scheduled based on the computational and communication requirements of the different steps of an algorithm as disclosed. Floating-point operations in the Update and Induction steps (FIG. 4) are completely data-parallel and need only nearest neighbor communication. These are trivially scheduled.

Figure 12:
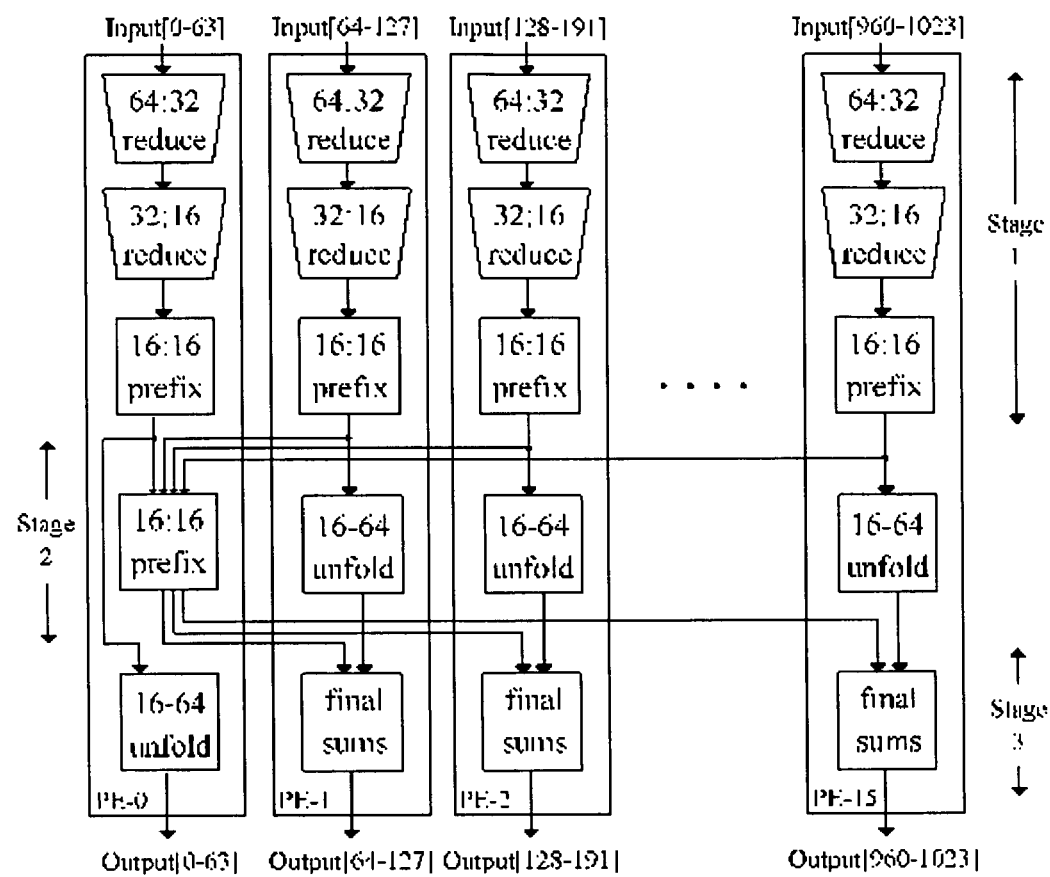
FIG. 12 shows a hybrid scheme for computing a parallel-prefix step according to an implementation of the algorithm of FIG. 4.

The parallel-prefix step, however, has a sequential critical path as well as more communication requirements. To schedule this step, a hybrid scheme is provided, where the prefix is first hierarchically decomposed into three stages, as shown in FIG. 12. It can be seen from Table II below that this reduces the number of floating-point additions from the full Sklansky-style computation by 45%.

TABLE II

| Prefix-Scheme | Floating-Point Operations |
|---|---|
| Brent-Kung | 2036 |
| Sklansky | 5120 |
| Hybrid | 2847 |

The first stage is run in parallel on all the PEs and involves computing an independent prefix on the local set of numbers. The second stage is mapped to a single PE (PE-0 in FIG. 12) and computes a prefix on the results from the 16 first stages.

Concurrently, with this stage, the rest of the PEs are unfolding the intermediate prefix sums for the 64 local inputs. At the end of these two stages, a partial global prefix of the inputs is obtained.

In the third stage, the partial global prefix is then distributed to corresponding PEs for independently generating the remaining prefix sums. During stage 2, since PE-0 was busy computing the partial global prefix, it was unable to compute the unfolding. Moreover, unlike other PEs, PE-0 is not required to calculate the intermediate sums from the global prefix. Hence, the unfolding of the intermediate prefix sums on PE-0 can conveniently be scheduled in stage 3. Cycle-by-cycles details of the schedule are provided in Annex 3. The termination detection step is scheduled to run concurrently on the integer adder since it involves a trivial zero comparison. We can use the idle floating-point adder to speculatively start the execution of the next iteration. When termination is detected, the speculative iteration is flushed from the execution pipeline. The number of cycles required to schedule all these steps is shown in Equation 16.

$$Tupdate = 64 \quad (16)$$

$$Tinduction = 128$$

$$Tprefix = 248$$

$$Titeration = Tupdate + Tinduction + Tprefix$$

$$= 248 + 64 + 128 = 440$$

$$Ttermination = 84 \; Ttotal = k(Titeration) + Ttermination$$

$$= k \times 440 + 84$$

Figure 13:
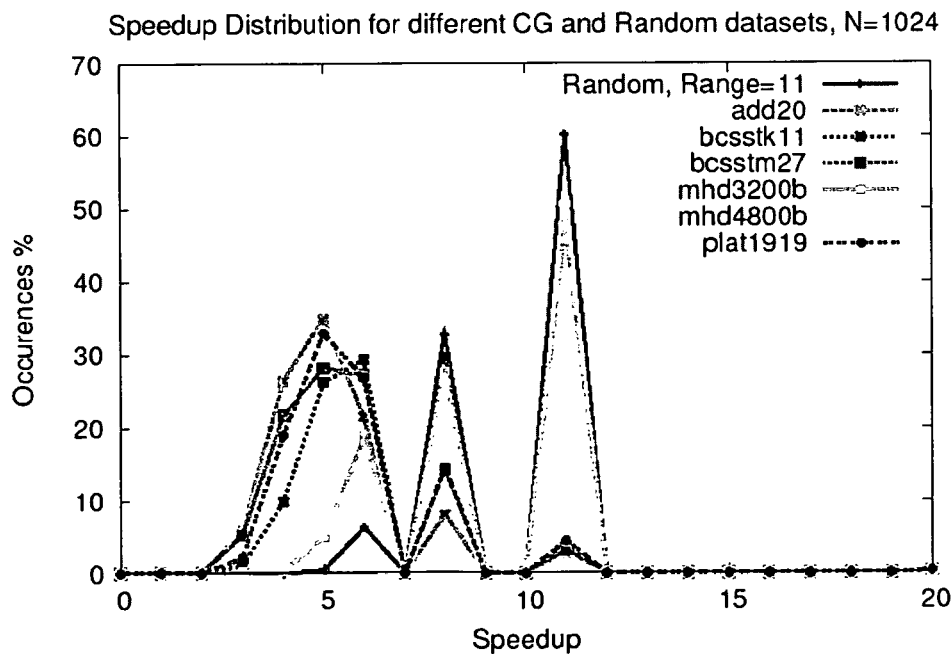
FIG. 13 shows gradient benchmarks and random datasets for the scheme of FIG. 12.

On the 16-PE FPGA-based design point, scheduled using the hybrid scheme, this translates into speedups in the range of 2-11 over the non-associative, sequential implementation for the different Conjugate Gradient benchmarks and random datasets as shown in FIG. 13. The average speedups achieved are shown in Table III below.

TABLE III

| Dataset | Average Speedup |
|---|---|
| add20 | 3.3 |
| bcsstk11 | 4.6 |
| bcsstm27 | 3.5 |
| mhd3200b | 7.3 |
| mhd4800b | 7.4 |
| plat1919 | 4.0 |
| random, range = 11 | 6.4 |

Average Speedups for Different Data Sets

In the above-described embodiments, average speedups of 3-7 are achieved at the expense of using 16 times the hardware of the sequential case.

Another example of the hybrid scheme used according to an embodiment will now be described for a case with N=64 and PE=16, in relation with FIGS. 14 and 15. A Sklansky case will require N/2=32 operations for each level. This requires (N/2)/PE=N/(2PE) cycles, or 2 for N=64 and PE=16. There are $log_2(N)=6$ levels. So the entire calculation requires 2*6=12 cycles. It performs 12×16=192 operations to compute the result.

Figure 14A:
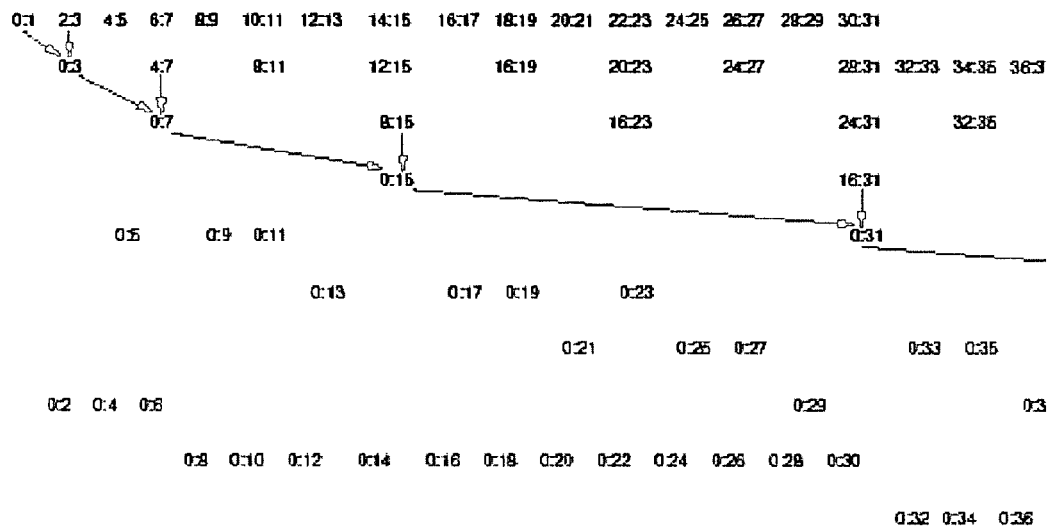
FIGS. 14a and 14b show a parallel prefix calculation using a Brent-Kung design.
Figure 14B:
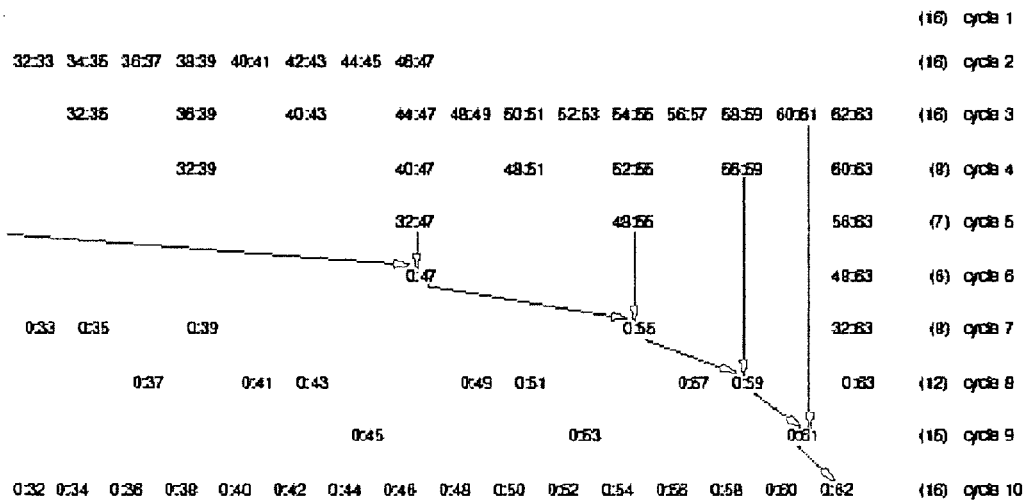
Figure 15A:
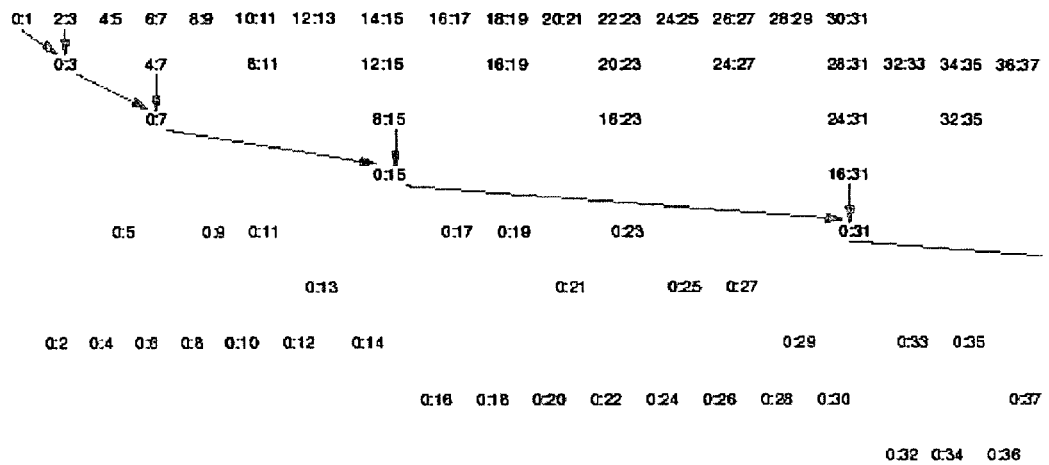
FIGS. 15a and 15b show the calculation of FIG. 14 using a hybrid design according to an embodiment of the present disclosure.
Figure 15B:
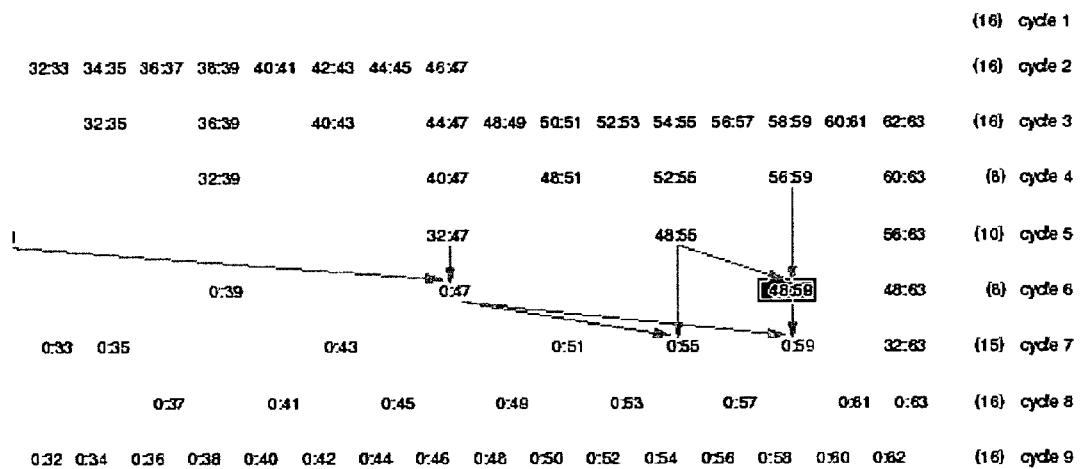

A careful schedule of the Brent-Kung case can be performed in 10 cycles, as shown in FIG. 14. The highlighted sequential dependence in the Brent-Kung dataflow prevents from performing this operation in any fewer cycles, even though there are adders sitting idle. Also, this design executes a total of 120 operations ($2(N-1)-log_2(N)=2\times 63-6=120$).

For a hybrid case according to an embodiment of the present disclosure, the operation 0:59 is completed one cycle earlier, so that the entire task is rescheduled and completed one cycle earlier. As shown in FIG. 15, this is achieved by adding an additional operation to calculate 48:59, so that 0:59 is calculated without waiting on 0:55; this allows to produce 0:59 on the same cycle as 0:55, one cycle earlier than the Brent-Kung schedule. As a result, the task is completed in 9 cycles rather than 10. The hybrid case executes 121 operations, one more than the Brent-Kung case in order to get this cycle reduction; nonetheless, One will note that in 8 cycles, one gets 128 operations, so it may be possible to improve the above-described hybrid and achieve a hybrid schedule that completes in 8 cycles. It is not possible to reduce the schedule below 8 cycles since even the 120 operations required for Brent-Kung will require at least 8 cycles.

In general, it is possible to reduce the sequential dependence in the parallel prefix further by performing additional operations such as the one shown above. In the extreme case, if one performs all operations in eager fashion, one returns to the Sklansky design. However, as shown the Sklansky design requires more cycles because it requires too many operations. This suggests that the optimium calculation will, in general, be as described above a hybrid between the Brent-Kung design and the Sklansky design.

Accordingly, the hybrid design according to an embodiment of the present disclosure comprises adding to a Brent-Kung design additional operations so as to achieve a schedule that completes faster than a Brent-Kung design, while requesting fewer operations than a Sklansky design.

The benefit demonstrated here is small (one cycle, or 10%), but the benefit increases with increasing N (N>2PE and PE large enough to have extra cycles).

The general approach to creating a hybrid optimized prefix tree is as follows:
1. Start by scheduling a Brent-Kung prefix computation on the available processors, minimizing cycles.
2. Identify the current schedule as the best schedule found so far.
3. While there are unused PE slots and the current schedule is no longer than the best schedule
   a. Find the set of operations in the critical path
   b. Find a min-cut in the critical path
   c. For each operation on the down (output) side of the cut
      i. identify the partial result which can be added, enabling the operation to be performed earlier
      ii. Modify the prefix tree to add this new operation and re-express the old operation in terms of this new one
   d. Reschedule the modified prefix computation on the available processors, minimizing cycles.
   e. If the resulting schedule is shorter than the best schedule so far, make this new schedule the best schedule.
4. Return the Best Schedule The foregoing detailed description and enclosed Annexes 1, 2, 3 and 4 are presented for purposes of illustration and disclosure in accordance with the requirements of the law. It is not intended to be exhaustive nor to limit the invention to the precise forms described, but only to enable others skilled in the art to understand how the invention may be suited for a particular use or implementation.

For example, one skilled in the art will readily understand that the optimistic associative sum technique disclosed above is applicable to parallelize any floating-point addition, not just IEEE. The above-described example discloses a transformation to perform a parallel, associative summation on a number of identical copies of a base floating-point adder core while achieving the same semantics as if the sum were performed sequentially on a single floating-point adder core. The rate of convergence may differ for floating-point cores with different behavior and semantics than the IEEE double-precision core assumed here.

The technique is general and can be applied to any sequence of potentially non-associative FP operations. For example, the technique works for subtraction (and arbitrary mix of addition and subtraction). For subtraction, the subtracted value(s) are simply negated and the problem reduces to addition. The technique can also be generalized to large multiply reduces. Saturated addition is another non-associative operation to which the technique can be applied.

One skilled in the art will recognize the duality between parallel computation and pipelining, recognizing that algorithms described in terms of PE unpipelined operators can also be executed on PE' operators with pipeline depth d, where PE=PE'×d.

One skilled in the art will also understand that there are many different formulations for parallel prefix. These formulations may trade-off latency and throughput. The different prefix shapes may also have an impact on the rate of convergence and hence the number of iterations, k, required. There may also be room to improve upon these results by more carefully exploring the parallel-prefix design space.

The possibility of modifications and variations will be apparent to practitioners skilled in the art. No limitation is intended by the description of exemplary embodiments which may have included tolerances, feature dimensions, specific operating conditions, engineering specifications, or the like, and which may vary between implementations or with changes to the state of the art, and no limitation should be implied therefrom. Applicants have made this disclosure with respect to the current state of the art, but also contemplates advancements and that adaptations in the future may take into consideration of those advancements, namely in accordance with the then current state of the art. It is intended that the scope of the invention be defined by the Claims as written and equivalents as applicable. Reference to a claim element in the singular is not intended to mean "one and only one" unless explicitly so stated. Moreover, no element, component, nor method or process step in this disclosure is intended to be dedicated to the public regardless of whether the element, component, or step is explicitly recited in the claims.

According to an embodiment, the type of addition described above can find application in any floating-point dot product. The dot-products can show up in matrix multiplication (both in sparse and dense multiplications), and this shows up in many signal processing tasks. For example, FIR (Finite-Impulse Response Filters) and IIRs. This kind of signal processing is common for audio and video signal processing (voice, speech recognition/compression, image filtering, 3D image rendering, RADAR, Sonar, SAR . . . )

According to an embodiment, the type of addition described above can find application in SMVM that are the core of CG and GMRES which solve a linear system of equations Ax=b. Arnoldi and Lanczos solve Ax=λ×x (λ here is a constant, the eigenvalue; for solutions to this equation x is the eigenvector associated with the eigenvalue). These linear algebra and eigenvalue/vector solutions show up in an important variety of numerical and physical simulations and optimizations (Scientific and Engineering Computations, Engineering Optimizations).

According to an embodiment, the type of addition described above can find application in simulations including: Differential and Partial Differential Equation solution and simulation; Finite-Element Analysis; Circuit Simulations (including SPICE); Geometric modelling and meshing (which can be part of 3D graphics); Molecular dynamics. Also it is noted that PageRank (the original Google search technology) is a variant on a sparse-matrix solve or exponentiation.

According to an embodiment, the type of addition described above can find application in Conjugate Gradient that can be used to find a set of parameters to minimize a convex function, which is a key routine for optimization (e.g. CAD).

According to an embodiment, the type of addition described above can be used to calculate Eigenvalues/vectors for Placement and partitioning (e.g. gate placement on a VLSI chip).

No claim element herein is to be construed under the provisions of 35 U.S.C. Sec. 112, sixth paragraph, unless the element is expressly recited using the phrase "means for . . ." and no method or process step herein is to be construed under those provisions unless the step, or steps, are expressly recited using the phrase "step(s) for . . . ."

ANNEX 1

Pseudocode for the algorithm schematized in FIG. 4.

```
// Step 1
Prefix[ ] = ParallelPrefix(Input[ ]);
Output[ ] = coreLoop(Input[ ], Prefix[ ]);
  coreLoop(Input[ ], Prefix[ ]) {
  terminate = true;
  // Step 2
  parallel for (int i=0; i<N; i++)
      specSum = Input[i] + Prefix[i−1];
      Error[i] = Prefix[i] − specSum;
      if (Error[i]!=0)
          terminate = false;
      end if
  end parallel for
  // Step 3
  if (!terminate)
      // Step 4
      ErrPrefix[ ] = ParallelPrefix(Error[ ]);
      // Step 5
      parallel for (int i=0; i<N; i++)
          Updated[i] = ErrPrefix[i]
                       + Prefix[i] ;
      end parallel for
      // Step 6
      return coreLoop(Input[ ], Updated[ ]);
  else
      // finish Step 3
      return Prefix[ ];
  end if
}
```

ANNEX 2

Random, double-precision, floating-point numbers were generated for the experimental analysis. Each double-precision floating-point number consists of a 53-bit mantissa(1.m), an 11-bit exponent(e) and a sign-bit(s). The value of the double-precision number in terms of the mantissa, exponent and sign is calculated as follows:

$$\text{number} = (\text{Sign}).(2^{Exponent})(1.\text{Mantissa}) \quad (17)$$

Pseudocode for the random number generation is shown here:

```
// select sign
  select_s( ) {
      // select +1 or −1
      if ( random(0 to 1) == 1)
          return 1
      else
          return −1
  }
  // select exponent with range r
  select_e (r) {
      // select between −1022 and 1023
      if (r==11)
          e = random(0 to 2^11−3)
          return (e−1022)
      // select between −2^(r−1)
      // and 2^(r−1)−1
      else
          e = random(0 to 2^r−1)
          return (e−2^(r−1))
      end if
  }
  // select mantissa
  select_m( ) {
      // select between 0 and 2^52−1
      m = random(0 to 2^52−1)
      // account for implicit 1 in 1.m
      return (2^53+m)/(2^53)
  }
  // generate floating-point number
  // with exponent range r
  random-gen(r) {
      return select_s( ) * 2^select_e(r)
                        * select_m( )
  }
```

ANNEX 3

$$T_{prefix} = \left(T_{64:32reduce} + T_{32:16reduce}\right) \quad (18)$$

$$+ T_{16:16prefix}$$

$$+ \left(T_{latency} + T_{16:16prefix} + T_{latency}\right)$$

$$+ T_{final-sum}$$

$$= (32 + 16) + 48 + (19 + 51 + 19) + 63$$

$$= 248$$

| 64:32 Reduce | | | |
|---|---|---|---|
| Cycle | Operation | Output | Comment |
| 0 | Input[0] + Input[1] | | Each PE, p, starts with |
| 1 | Input[2] + Input[3] | | numbers Input[64 * p] to |
| 2 | Input[4] + Input[5] | | Input[64 * (p + 1) − 1], |
| ... | ... | | $0 \leq p \leq 15$. In this schedule, |
| 8 | Input[16] + Input[17] | | we omit p for clarity. |
| 9 | Input[18] + Input[19] | | |
| 10 | Input[20] + Input[21] | Input[0:1] | First results ready at the output of the FP-adder |
| 11 | Input[22] + Input[23] | Input[2:3] | |
| 12 | Input[24] + Input[25] | Input[4:5] | |
| ... | ... | ... | |
| 30 | Input[60] + Input[61] | Input[40:41] | |
| 31 | Input[62] + Input[63] | Input[42:43] | |
| 32 | | Input[44:45] | |
| 33 | | Input[46:47] | |
| 34 | | Input[48:49] | |
| ... | ... | ... | |
| 40 | | Input[60:61] | |
| 41 | | Input[62:63] | |

| 32:16 Reduce | | | |
|---|---|---|---|
| Cycle | Operation | Output | Comment |
| 32 | Input[0:1] + Input[2:3] | | The start of the 32:16 reduce overlaps with the tail of the 64:32 reduce. |
| 33 | Input[4:5] + Input[6:7] | | |
| 34 | Input[8:9] + Input[10:11] | | |
| ... | ... | ... | |
| 39 | Input[28:29] + Input[30:31] | | |
| 40 | Input[32:33] + Input[34:35] | | |
| 41 | Input[36:37] + Input[38:39] | | |
| 42 | Input[40:41] + Input[42:43] | Input[0:3] | |
| 43 | Input[44:45] + Input[46:47] | Input[4:7] | |

| 32:16 Reduce | | | |
|---|---|---|---|
| Cycle | Operation | Output | Comment |
| 44 | Input[48:49] + Input[50:51] | Input[8:11] | |
| 45 | Input[52:53] + Input[54:55] | Input[12:15] | |
| 46 | Input[56:57] + Input[58:59] | Input[16:19] | |
| 47 | Input[60:61] + Input[62:63] | Input[20:23] | |
| 48 | | Input[24:27] | |
| 49 | | Input[28:31] | |
| 50 | | Input[32:35] | |
| ... | ... | ... | |
| 56 | | Input[56:59] | |
| 57 | | Input[60:63] | |

| 16:16 Prefix | | | |
|---|---|---|---|
| Cycle | Operation | Output | Comment |
| 48 | Reduce[0] + Reduce[1] | | The start of the 16:16 prefix overlaps with the tail of the 32:16 reduce. Reduce[i] = Input[64p + (4i): 64p + (4i + 3)], $0 \leq i \leq 15$. This schedule is reused for computing GlobalReduce[ ] in PE-0. GlobalReduce starts at cycle 114. |
| 49 | Reduce[1] + Reduce[3] | | |
| 50 | Reduce[4] + Reduce[5] | | |
| 51 | Reduce[6] + Reduce[7] | | |
| 52 | Reduce[8] + Reduce[9] | | |
| 53 | Reduce[10] + Reduce[11] | | |
| 54 | Reduce[12] + Reduce[13] | | |
| 55 | Reduce[14] + Reduce[15] | | |
| 56 | | | |
| 57 | | | |
| 58 | Reduce[0:1] + Reduce[2] | Reduce[0:1] | |
| 59 | Reduce[0:1] + Reduce[2:3] | Reduce[2:3] | |
| 60 | Reduce[4:5] + Reduce[6] | Reduce[4:5] | |
| 61 | Reduce[4:5] + Reduce[6:7] | Reduce[6:7] | |
| 62 | Reduce[8:9] + Reduce[10] | Reduce[8:9] | |
| 63 | Reduce[8:9] + Reduce[10:11] | Reduce[10:11] | |
| 64 | Reduce[12:13] + Reduce[14] | Reduce[12:13] | |
| 65 | Reduce[12:13] + Reduce[14:15] | Reduce[14:15] | |
| 66 | | | |
| 67 | | | |
| 68 | | Reduce[0:2] | |
| 69 | Reduce[0:3] + Reduce[4] | Reduce[0:3] | |
| 70 | Reduce[0:3] + Reduce[4:5] | Reduce[4:6] | |
| 71 | Reduce[0:3] + Reduce[4:7] | Reduce[4:7] | |
| 72 | Reduce[0:3] + Reduce[4:6] | Reduce[8:10] | |
| 73 | Reduce[8:11] + Reduce[12] | Reduce[8:11] | |
| 74 | Reduce[8:11] + Reduce[12:13] | Reduce[12:14] | |
| 75 | Reduce[8:11] + Reduce[12:15] | Reduce[12:15] | |
| 76 | Reduce[8:11] + Reduce[12:14] | | |
| 77 | | | |
| 78 | | | |
| 79 | | Reduce[0:4] | |
| 80 | | Reduce[0:5] | |
| 81 | Reduce[0:7] + Reduce[8] | Reduce[0:7] | |
| 82 | Reduce[0:7] + Reduce[8:9] | Reduce[0:6] | |
| 83 | Reduce[0:7] + Reduce[8:10] | Reduce[8:12] | |
| 84 | Reduce[0:7] + Reduce[8:11] | Reduce[8:13] | |
| 85 | Reduce[0:7] + Reduce[8:15] | Reduce[8:15] | |
| 86 | Reduce[0:7] + Reduce[8:12] | Reduce[8:14] | |
| 87 | Reduce[0:7] + Reduce[8:13] | | |
| 88 | Reduce[0:7] + Reduce[8:14] | | |
| 89 | | | |
| 90 | | | |
| 91 | | Reduce[0:8] | |
| 92 | | Reduce[0:9] | |
| 93 | | Reduce[0:10] | |
| 94 | | Reduce[0:11] | |
| 95 | | Reduce[0:15] | Communicate this value to PE-0 to start GlobalReduce. |
| 96 | | Reduce[0:12] | |
| 97 | | Reduce[0:13] | |
| 98 | | Reduce[0:14] | |

16:64 Unfold

| Cycle | Operation | Output | |
|---|---|---|---|
| 89 | Reduce[0] + Input[4] | | All PEs except PE-0 |
| 90 | Reduce[0:1] + Input[8] | | implement this schedule. |
| 91 | Reduce[0:2] + Input[12] | | PE-0 will be busy |
| ... | ... | | computing GlobalReduce. |
| 97 | Reduce[0:8] + Input[36] | | GlobalReduce in PE-0 |
| 98 | Reduce[0:9] + Input[40] | | takes more cycles to |
| 99 | Reduce[0:10] + Input[44] | Unfold[4] | terminate than this 16:64 Unfold. Latter |
| 100 | Reduce[0:11] + Input[48] | Unfold[8] | stages start only after GlobalReduce has finished. |
| 101 | Reduce[0:12] + Input[52] | Unfold[12] | |
| ... | ... | ... | |
| 132 | Unfold[57] + Input[58] | Unfold[18] | |
| 133 | Unfold[61] + Input[62] | Unfold[22] | |
| 134 | | Unfold[26] | |
| 135 | | Unfold[30] | |
| ... | ... | ... | |
| 142 | | Unfold[58] | |
| 143 | | Unfold[62] | |

Final Sums

| Cycle | Operation | Output | Comment |
|---|---|---|---|
| 185 | GlobalReduce[p − 1] + Unfold[0] | | p is the index of the PE where |
| 186 | GlobalReduce[p − 1] + Unfold[1] | | this schedule is mapped. |
| 187 | GlobalReduce[p − 1] + Unfold[2] | | GlobalReduce[p − 1] = |
| ... | ... | | Input[0:64 * (p − 1) − 1], |
| 193 | GlobalReduce[p − 1] + Unfold[8] | | Output[i] = Input[0:64 * |
| 194 | GlobalReduce[p − 1] + Unfold[9] | | (p − 1) − 1 + *]. This |
| 195 | GlobalReduce[p − 1] + Unfold[10] | Output[0] | schedule is valid only for PEs other than PE-0. PE-0 is computing |
| 196 | GlobalReduce[p − 1] + Unfold[11] | Output[1] | the 16:64 unfold in this time. Final Sums takes more cycles than |
| 197 | GlobalReduce[p − 1] + Unfold[12] | Output[2] | the 16:64 unfold. Hence, Final Sums is included when computing total |
| ... | ... | ... | cycles required. |
| 246 | GlobalReduce[p − 1] + Unfold[61] | Output[51] | |
| 247 | GlobalReduce[p − 1] + Unfold[62] | Output[52] | |
| 248 | | Output[53] | |
| 249 | | Output[54] | |
| 250 | | Output[55] | |
| ... | ... | ... | |
| 256 | | Output[61] | |
| 257 | | Output[62] | |

ANNEX 4

References

[1] I. S. Committee, IEEE Standard for Binary Floating-Point Arithmetic, IEEE, 345 East 47th Street, New York, N.Y. 10017, July 1985, ANSI/IEEE Std 754-1985.

[2] C. McNairy and D. Soltis, "Itanium 2 processor microarchitecture," IEEE Micro, vol. 23, no. 2, pp. 44-55, March/April 2003.

[3] K. S. Hemmert and K. D. Underwood, "Poster: Open source high performance floating-point modules," in Proceedings of the IEEE Symposium on Field-Programmable Custom Computing Machines, April 2006.

[4] H. Leuprecht and W. Oberaigner, "Parallel algorithms for rounding exact summation of floating point numbers," Computing, vol. 28, pp. 89-104, 1982.

[5] S. M. Rump, T. Ogita, and S. Oishi, "Accurate floating-point summation," Faculty of Information and Communication Sciences, Hamburg University of Technology, Institute for Reliable Computing, Hamburg University of Technology, Schwarzenbergstrasse 95, Hamburg 21071, Germany, Tech. Rep. 05.12, November 2005.

[6] Z. Luo and M. Martonosi, "Accelerating pipelined integer and floating-point accumulations in configurable hardware with delayed addition techniques," IEEE Transactions on Computers, vol. 49, no. 3, pp. 208-218, March 2000.

[7] R. P. Brent and H. T. Kung, "A regular layout for parallel adders," IEEE Transactions on Computers, vol. 31, no. 3, pp. 260-264, March 1982.

[8] J. Sklanksy, "Conditional-sum addition logic," IRE Transactions of Electronic Computers, vol. EC-9, pp. 226-231, June 1960.

[9] P. Kogge and H. Stone, "A parallel algorithm for the efficient solution of a general class of recurrence relations," IEEE Transactions on Computers, vol. C-22, no. 8, pp. 786-793, August 1973.

[10] T. Han and D. Carlson, "Fast area-efficient VLSI adders," in 8th Symposium of Computer Arithmetic, September 1987, pp. 49-56.

[11] W. D. Hillis and G. L. Steele, "Data parallel algorithms,"Communications of the ACM, vol. 29, no. 12, pp. 1170-1183, December 1986.

[12] F. T. Leighton, Introduction to Parallel Algorithms and Architectures: Arrays, Trees, Hypercubes. Publishers, Inc., 1992.

[13] NIST, "Matrix market,"<http://math.nist.gov/Matrix-Market/>, June 2004, maintained by: National Institute of Standards and Technology (NIST).

[14] R. Kelsey, W. Clinger, and J. Rees, "Revised report on the algorithmic language scheme," Higher-Order and Symbolic Computation, vol. 11, no. 1, August 1998.

[15] K. Underwood, "FPGAs vs. CPUs: Trends in Peak Floating-Point Performance," in Proceedings of the International Symposium on Field-Programmable Gate Arrays, February 2004, pp. 171-180. Morgan Kaufmann

What is claimed is:

1. A circuit for calculating a sequence of non-associative operations, comprising:
an associative calculator for calculating from a set of input data an evaluated value of each operation of said sequence as if the non-associative operations were associative operations;
a detector for detecting if some of the evaluated values are erroneous; and
a corrector for correcting the erroneous evaluated values, if there are erroneous values, wherein the associative calculator is provided for:
breaking down each operation in a number of intermediate operations;
calculating in parallel the results of said intermediate operations; and
using the results of the intermediate operations to calculate the evaluated value of each operation comprising the intermediate operations,
wherein the operations of the sequence of operations and the intermediate operations are floating point summations,
wherein the calculator comprises a plurality of adders for calculating in parallel the results of said intermediate operations, and
wherein the detector is provided for detecting if some of the evaluated values are erroneous by calculating, for the evaluated value of each summation of the sequence, an error value equal to the difference between:
said evaluated value; and
a sum of
the evaluated value of the previous summation of the sequence; and
the input data not common to the calculation of said evaluated value and the evaluated value of the previous summation of the sequence.

2. The circuit of claim 1, wherein the corrector for correcting the erroneous evaluated values, if there are erroneous values, comprises a plurality of adders for calculating in parallel, for the evaluated value of each summation of the sequence, a corrected evaluated value equal to a parallel summation of:
said evaluated value;
the error value calculated for the evaluated value of said summation; and
each error value calculated for the evaluated value of each previous summation of the sequence.

3. The circuit of claim 2, wherein the corrector and the associative calculator share a same plurality of adders and wherein the corrector is further provided for:
detecting if some of the corrected evaluated values are erroneous; and
if so, correcting the erroneous values until no corrected evaluated value is erroneous.

4. The circuit of claim 3, wherein the plurality of adders comprises a network of statically-scheduled, pipelined floating-point adders.

5. A circuit for calculating a sequence of non-associative operations, comprising:
an associative calculator for calculating from a set of input data an evaluated value of each operation of said sequence as if the non-associative operations were associative operations;
a detector for detecting if some of the evaluated values are erroneous; and
a corrector for correcting the erroneous evaluated values, if there are erroneous values, wherein the associative calculator is provided for:
breaking down each operation in a number of intermediate operations;
calculating in parallel the results of said intermediate operations; and
using the results of the intermediate operations to calculate the evaluated value of each operation comprising the intermediate operations,
wherein the operations of the sequence of operations and the intermediate operations are floating point summations,
wherein the calculator comprises a plurality of adders for calculating in parallel the results of said intermediate operations, and
wherein the plurality of adders are controlled according to a hybrid parallel-prefix design which completes in fewer cycles than Brent-Kung or Sklansky when scheduled on a fixed number of processing elements.

6. The circuit of claim 5 wherein the hybrid parallel-prefix design is obtained by:
computing the number of free slots in the Brent-Kung design;
adding operations to the Brent-Kung design to reduce the length of the sequentially dependent path;
constraining the number of operations added to be lower than the number of identified free slots.

* * * * *